United States Patent
Nomura et al.

(10) Patent No.: US 12,366,937 B2
(45) Date of Patent: *Jul. 22, 2025

(54) METHOD OF OUTPUTTING PEN-UP INFORMATION BASED ON DETECTED POSITION OF ACTIVE PEN

(71) Applicant: Wacom Co., Ltd., Saitama (JP)

(72) Inventors: Yoshio Nomura, Saitama (JP); Yasuo Oda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,682

(22) Filed: Apr. 22, 2024

(65) Prior Publication Data

US 2024/0272740 A1    Aug. 15, 2024

Related U.S. Application Data

(63) Continuation of application No. 18/346,088, filed on Jun. 30, 2023, now Pat. No. 12,014,002, which is a
(Continued)

(51) Int. Cl.
*G06F 3/044* (2006.01)
*G06F 3/0354* (2013.01)
(Continued)

(52) U.S. Cl.
CPC ...... *G06F 3/04162* (2019.05); *G06F 3/03545* (2013.01); *G06F 3/04166* (2019.05);
(Continued)

(58) Field of Classification Search
CPC ............. G06F 3/04162; G06F 3/04166
See application file for complete search history.

(56) References Cited

U.S. PATENT DOCUMENTS 10,719,145 B1    7/2020    Files et al.
2008/0042985 A1    2/2008    Katsuhito et al.
(Continued)

FOREIGN PATENT DOCUMENTS

JP    4787087 B2    10/2011
JP    2012022543 A    2/2012
(Continued)

OTHER PUBLICATIONS

International Search Report, mailed Sep. 12, 2017, for International Patent 1 Application No. PCT/JP2017/021263. (1 page).
(Continued)

*Primary Examiner* — Sejoon Ahn
(74) *Attorney, Agent, or Firm* — Seed IP Law Group LLP

(57) ABSTRACT

A pointer position detection method performed by a sensor controller connected to a sensor pattern includes: detecting a pen signal transmitted via a pen electrode provided at a distal end of an active pen, detecting a position of the active pen based on a level of the pen signal detected; detecting one or more candidate touch positions of a passive pointer that does not transmit a signal by detecting one or more changes of one or more capacitances of the sensor pattern, and outputting, as the position of the passive pointer, the one or more candidate touch positions remaining after excluding the position of the active pen from the one or more candidate touch positions.

9 Claims, 21 Drawing Sheets

Related U.S. Application Data continuation of application No. 17/728,839, filed on Apr. 25, 2022, now Pat. No. 11,726,604, which is a continuation of application No. 16/684,023, filed on Nov. 14, 2019, now Pat. No. 11,340,728, which is a continuation of application No. PCT/JP2017/021263, filed on Jun. 8, 2017.

(51) Int. Cl.
*G06F 3/041* (2006.01)
*G06F 3/042* (2006.01)

(52) U.S. Cl.
CPC ........ *G06F 3/04186* (2019.05); *G06F 3/0421* (2013.01); *G06F 3/0441* (2019.05); *G06F 3/0442* (2019.05); *G06F 3/0446* (2019.05)

(56) References Cited

U.S. PATENT DOCUMENTS

| | | | |
|---|---|---|---|
| 2010/0321339 A1* | 12/2010 | Kimmel | G06F 3/0412 345/175 |
| 2012/0013555 A1 | 1/2012 | Maeda et al. | |
| 2012/0182238 A1 | 7/2012 | Lee | |
| 2014/0168142 A1 | 6/2014 | Sasselli et al. | |
| 2014/0232669 A1* | 8/2014 | Ohlsson | G06F 3/04166 345/173 |
| 2014/0267104 A1 | 9/2014 | Ahmed et al. | |
| 2015/0309597 A1* | 10/2015 | Fujii | G06F 3/03545 345/173 |
| 2015/0378450 A1 | 12/2015 | Petkov et al. | |
| 2016/0139730 A1 | 5/2016 | Kida et al. | |
| 2016/0306497 A1 | 10/2016 | Nagai et al. | |
| 2016/0313812 A1 | 10/2016 | Katsurahira | |
| 2018/0024654 A1 | 1/2018 | Koike et al. | |
| 2018/0039337 A1* | 2/2018 | Yao | G06F 3/0421 |
| 2018/0042127 A1* | 2/2018 | Kim | G06F 3/044 |
| 2018/0101250 A1 | 4/2018 | Katsurahira et al. | |
| 2018/0154679 A1 | 6/2018 | Mitchell | |
| 2018/0157351 A1 | 6/2018 | Lee | |
| 2018/0157361 A1 | 6/2018 | Kim | |
| 2018/0329532 A1 | 11/2018 | Noguchi | |
| 2019/0204939 A1* | 7/2019 | Ju | G06F 3/04162 |
| 2019/0204989 A1* | 7/2019 | Shin | G06F 3/0412 |
| 2019/0220133 A1* | 7/2019 | Han | G06F 3/0485 |
| 2019/0220161 A1* | 7/2019 | Loftus | G06F 3/04883 |
| 2019/0227366 A1* | 7/2019 | Harrold | G02F 1/1323 |
| 2019/0227643 A1* | 7/2019 | Lee | G06F 3/03545 |
| 2019/0227646 A1* | 7/2019 | Ye | G06F 3/041 |
| 2019/0227658 A1* | 7/2019 | Lin | G06F 3/04166 |

FOREIGN PATENT DOCUMENTS

| | | |
|---|---|---|
| JP | 2014209291 A | 11/2014 |
| JP | 2016099687 A | 5/2016 |
| JP | 2016517101 A | 6/2016 |
| JP | 2016206803 A | 12/2016 |
| JP | 6082172 B1 | 2/2017 |
| JP | 2017058718 A | 3/2017 |
| JP | 2017068855 A | 4/2017 |
| TW | 201710840 A | 3/2017 |
| WO | WO 2017002272 A1 | 1/2017 |

OTHER PUBLICATIONS

Office Action, dated Apr. 24, 2019, for Japanese Patent Application No. 2019-010852. (62 pages) (with English Translation).
Office Action, dated Mar. 9, 2021, for Japanese Patent Application No. 2019-202072. (4 pages) (with English Translation).

* cited by examiner

FIG.6A

| CANDIDATE PEN POSITION | DECIDED PEN POSITION | VALID FLAG |
|---|---|---|
| cP[0]=(x0,y0) | fP[0]=cP[0] | VALID |
| cP[1]=(x1,y1) | fP[1]=NULL | INVALID |
| ⋮ | ⋮ | ⋮ |

FIG.6B

| CANDIDATE TOUCH POSITION | DECIDED TOUCH POSITION | VALID FLAG | REGION TYPE |
|---|---|---|---|
| cT[0]=(x0,y0) | fT[0]=NULL | INVALID | – |
| cT[1]=(x1,y1) | fT[1]=cT[1] | INVALID | PALM |
| cT[2]=(x2,y2) | fT[2]=cT[2] | VALID | FINGER |
| ⋮ | ⋮ | ⋮ | ⋮ |

METHOD OF OUTPUTTING PEN-UP INFORMATION BASED ON DETECTED POSITION OF ACTIVE PEN

BACKGROUND

Technical Field

The present disclosure relates to a pointer position detection method, and more particularly to a pointer position detection method for performing parallel detection of an active capacitance type electronic pen and a passive pointer such as a finger.

Background Art

An electronic pen of an electromagnetic resonance type (hereinafter referred to as "EMR pen") has been known. The EMR pen is an electronic pen configured to transmit an alternating magnetic field from a pen tip. A distal end of the EMR pen is constituted by a non-conductor such as resin so as not to disturb the alternating magnetic field.

Recently, development of an active capacitance type pen (hereinafter referred to as "active pen") has been in progress. The active pen is an electronic pen configured to transmit signals from a pen tip by utilizing an electric field. A distal end of the active pen includes a conductor such as metal functioning as an antenna for generating an electric field (i.e., pen electrode).

In addition, use of a finger, or an auxiliary device which does not transmit signals similarly to a finger (hereinafter collectively referred to as "passive pointer"), for example, together with an electronic pen has been increasing in recent years. For example, a finger of a left hand or an auxiliary device is used to perform an auxiliary operation such as zoom-in, zoom-out, and rotation while drawing a picture using an electronic pen held by a right hand. In this case, a position detector for detecting a pointer needs to execute parallel detection of the electronic pen and the passive pointer.

Japanese Patent No. 4787087 (hereinafter, Patent Document 1) discloses an example of a position detector which performs parallel detection of an EMR pen and a passive pointer. As illustrated in FIG. 4 of this literature, the position detector executing parallel detection of the EMR pen and the passive pointer is required to prepare sensors separately used for the respective detections. The sensor for detecting the EMR pen has a function of generating an alternating magnetic field, and a function of receiving a signal transmitted from the EMR pen. On the other hand, the sensor for detecting the passive pointer has a function of detecting capacity coupling formed between a distal end of the passive pointer (e.g., finger tip) and an electrode disposed inside the sensor. The passive pointer does not transmit a signal in response to an alternating magnetic field, while the EMR pen does not form capacity coupling with the electrode inside the sensor. Accordingly, detection of the EMR pen and detection of the passive pointer can be executed perfectly at the same timing (not in time-divided manner).

Furthermore, Japanese Patent No. 6,082,172 discloses an example of a position detector which performs parallel detection of an active pen and a passive pointer. As illustrated in FIG. 6 of this literature, detection of the active pen and detection of the passive pointer are executed by using the same sensor. This sensor achieves detection of the passive pointer by detecting capacity coupling formed between a distal end of the passive pointer and an electrode disposed inside the sensor similarly to the sensor for detecting the passive pointer described in Patent Document 1. However, this sensor achieves detection of the active pen by transmitting a signal to the active pen, and receiving a signal transmitted from the active pen in response to the transmitted signal. In this case, each of a conductor disposed at the distal end of the active pen (i.e., pen electrode) and the electrode disposed inside the sensor functions as an antenna for transmitting and receiving signals. In the configuration that detection of the passive pointer and detection of the active pen are performed by the same sensor as in this example, detection of the active pen and detection of the passive pointer are difficult to execute perfectly at the same timing, and therefore are executed in a time-divided manner.

A conventional position detector which executes parallel detection of an active pen and a passive pointer produces a problem of mutual misrecognition between a contact position of the active pen and a contact position of the passive pointer, wherefore improvement has been demanded in this point. This problem is hereinafter detailed.

First, the position detector misrecognizes the contact position of the active pen as the contact position of the passive pointer because capacity coupling is formed between the pen electrode of the active pen and the electrode inside the sensor. The position detector does not distinguish this capacity coupling from capacity coupling formed by the contact of the passive pointer, and therefore misrecognizes the contact of the active pen as the contact of the passive pointer. Recently, the number of a position detector configured to distinguish between a plurality of passive pointers is increasing. However, this type of position detector misrecognizes contact of the active pen as contact of the second or third passive pointer.

Second, the position detector misrecognizes the contact position of the passive pointer as the contact position of the active pen because a transmission signal of the active pen is conducted to a palm or the like via a human body, and then transmitted to the sensor from the palm or the like. The position detector does not distinguish between the signal thus received and a signal directly transmitted from the pen electrode of the active pen, and therefore misrecognizes the contact position of the palm as the contact position of the active pen.

BRIEF SUMMARY

Accordingly, an object of the present disclosure is to provide a pointer position detection method capable of achieving correct distinction between a contact position of an active pen and a contact position of a passive pointer.

In addition, detection of an active pen and detection of a passive pointer are executed in a time-divided manner as described above. Assuming that a time required for detection of the active pen is set to 3 milliseconds for each detection, that a time required for detection of the passive pointer is set to 2 milliseconds for each detection, and that detection of the active pen and detection of the passive pointer are alternately executed, a detection rate of the active pen and a detection rate of the passive pointer are equalized (about 200 (⅕×1,000) detections per second for both).

In this case, such a method which detects the passive pointer once subsequently to successive detection of the active pen twice is considered, for example, for further improvement of the detection rate of the active pen.

However, when a control method which simply executes detection of the active pen and detection of the passive pen at any appropriate ratio of the respective detections as described above, intervals of detection of the active pen may become irregular. According to the example described above, for example, after successive execution of detection of the active pen twice, subsequent detection of the active pen is not performed until completion of detection of the passive pointer. In this case, an unnatural drawing result may be produced in such a drawing application which operates based on an expectation that coordinate data indicating the active pen and sequentially output from a sensor controller is transmitted at regular intervals in view of time, for example. Accordingly, improvement has been demanded in this point.

Another object of the present disclosure therefore is to provide a pointer position detection method capable of executing detection of an active pen at regular intervals while maintaining detection rates of both the active pen and a passive pointer.

A position detector detecting an active pen may misrecognize a position not in contact with the active pen and a passive pointer as a contact position of the active pen. This misrecognition is caused when such a current path is formed which extends from a pen electrode of the active pen, passes through an electrode inside a sensor, enters an arm opposite to a hand holding the active pen, passes through a human body, and returns to the active pen. In this case, a transmission signal of the active pen may be detected below the corresponding arm. The contact position of the active pen misrecognized in this manner is hereinafter referred to as a "ghost position."

For example, when the active pen suddenly shifts to the inside of a touch surface from a bezel region of a tablet constituting the position detector, the position detector may detect a ghost position before detection of an actual pen position. In this case, an unnecessary line segment is drawn between the detected ghost position and the actual pen position detected immediately after the detection of the ghost position. Accordingly, improvement has been demanded in this point.

A further object of the present disclosure therefore is to provide a pointer position detection method capable of preventing drawing of an unnecessary line segment caused by presence of a ghost position.

An aspect of the present disclosure is directed to a pointer position detection method performed by a sensor controller connected to a sensor pattern. The method includes: detecting a pen signal transmitted via a pen electrode provided at a distal end of an active pen, detecting a position of the active pen based on a level of the pen signal detected, detecting one or more candidate touch positions of the passive pointer by detecting one or more changes of one or more capacitances of the sensor pattern, and outputting, as a position of the passive pointer, the one or more candidate touch positions remaining after excluding the position of the active pen from the one or more candidate touch positions.

Another aspect of the present disclosure is directed to a pointer position detection method for detecting a position of a pointer present within a predetermined region. The method includes: performing 1/N of a first detection process at a first detection rate, including acquiring partial detection data that indicates whether a first pointer is detected based on the performing of the 1/N of the first detection process, and storing the partial detection data in a memory; combining (N−1) partial detection data already stored in the memory and the partial detection data responsive to the partial detection data being stored in the memory by the storing, including generating detection data that indicates whether the first pointer is detected throughout the predetermined region; and outputting the detection data at the first detection rate.

A further aspect of the present disclosure is directed to a pointer position detection method for detecting a position of a pointer present within a predetermined region. The method includes: performing 1/N of a first detection process at a first detection rate, including acquiring partial detection data that indicates whether a first pointer is present within the predetermined region, and storing the partial detection data in a memory; and performing a second process at a second detection rate to detect a second pointer, the second pointer being different from the first pointer. The second detection process and the first detection process are alternately performed.

A still further aspect of the present disclosure is directed to a pointer position detection method for detecting a pointer present within a predetermined region including K first electrodes and K second electrodes. The method includes: sequentially reading from a memory one pulse group among N×M pulse groups each including K pulses, including transmitting the K pulses included in the one pulse group to each of the K first electrodes every time the one pulse group is read by the reading, and storing in the memory partial detection data that indicates levels of signals output from each of the K second electrodes as a result of the transmitting; and combining the partial detection data corresponding to respective M pulse groups and stored by the storing with the partial detection data already stored in the memory and corresponding to (N−1)×M pulse groups for each of the second electrodes every time the partial detection data is stored in the memory by the storing, and generating combined detection data that indicates whether the pointer is present on a corresponding second electrode.

A still further aspect of the present disclosure is directed to a pointer position detection method performed by a sensor controller. The method includes: detecting a position of a passive pointer that does not transmit a signal by detecting a change of a capacitance in the sensor pattern, and determining a palm region; detecting a pen signal transmitted via s pen electrode provided at a distal end of an active pen, and detecting a position of the active pen based on a level of the pen signal detected; and outputting pen-up information indicating that the active pen is separated from a touch surface (1) in response to determining that a previously detected position of the active pen lies within a predetermined region formed based on the palm region, and (2) in response to determining that a distance between a currently detected position of the active pen and the previously detected position of the active pen exceeds a predetermined value.

A still further aspect of the present disclosure is directed to a pointer position detection method executed by a sensor controller. The method includes: detecting a position of a passive pointer that does not transmit a signal by detecting a change of a capacitance in the sensor pattern, and determining a palm region; and detecting a pen signal transmitted via a pen electrode provided at a distal end of an active pen, detecting a position of the active pen based on a level of the pen signal detected, detecting a writing pressure based on the pen signal transmitted from the active pen, and determining whether the position of the active pen is located proximate to the palm region. When the position of the active pen is determined to be proximate to the palm region, the pen position is invalidated in a case where the writing pressure is determined to be invalid, and the position of the active pen is validated in a case where the writing pressure is determined to be valid.

The pointer position detection method according to the present disclosure is capable of selecting one or more candidate touch positions output as a passive pointer position in accordance with an active pen position retained in a memory. Accordingly, correct distinction between a contact position of an active pen and a contact position of a passive pointer is achievable.

The pointer position detection method according to the present disclosure divides a first detection process (passive pointer position detection process) into N processes, and executes the divided processes. Accordingly, the method can detect the active pen at regular intervals while maintaining detection rates of both the active pen and the passive pointer.

The pointer position detection method according to the present disclosure is capable of outputting pen-up information when a distance between a pen positon currently detected and a pen position previously detected exceeds a predetermined value. Accordingly, drawing of an unnecessary line segment caused by presence of a ghost position is avoidable.

BRIEF DESCRIPTION OF THE DRAWINGS

FIG. 6A depicts a pen position table used in an output position determination process according to an embodiment of the present disclosure, while FIG. 6B depicts a touch position table used in the output position determination process according to an embodiment of the present disclosure;

FIG. 12A is a chart depicting a control sequence of the pointer position detection process according to the related art of the present disclosure, while

DETAILED DESCRIPTION

Embodiments according to the present disclosure are hereinafter described in detail with reference to the accompanying drawings.

Figure 1:
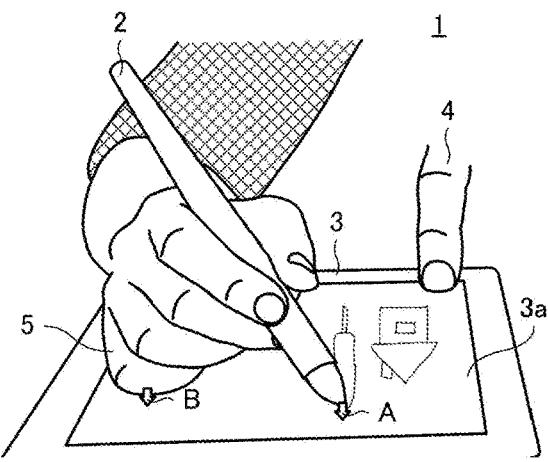
FIG. 1 is a view illustrating an example of a state of use of a position detection system according to a first embodiment of the present disclosure.

FIG. 1 is a view illustrating an example of a state of use of a position detection system 1 according to a first embodiment of the present disclosure. As illustrated in this figure, the position detection system 1 according to the present embodiment includes an active pen 2 and a tablet 3. The tablet 3 has a touch surface 3a, and is configured to detect positions of the active pen and a passive pointer on the touch surface 3a. FIG. 1 illustrates a state in which a pen tip of the active pen 2, a distal end of a finger 4 as a passive pointer, and a hand 5 of a user holding the active pen 2 are in contact with the touch surface 3a. The finger 4 of the user is presented as an example of the passive pointer. The type of the passive pointer according to the present embodiment is not particularly limited. In the following description, the active pen 2, and the passive pointer such as the finger 4 as a typical example are also collectively referred to as "pointers."

Figure 2:
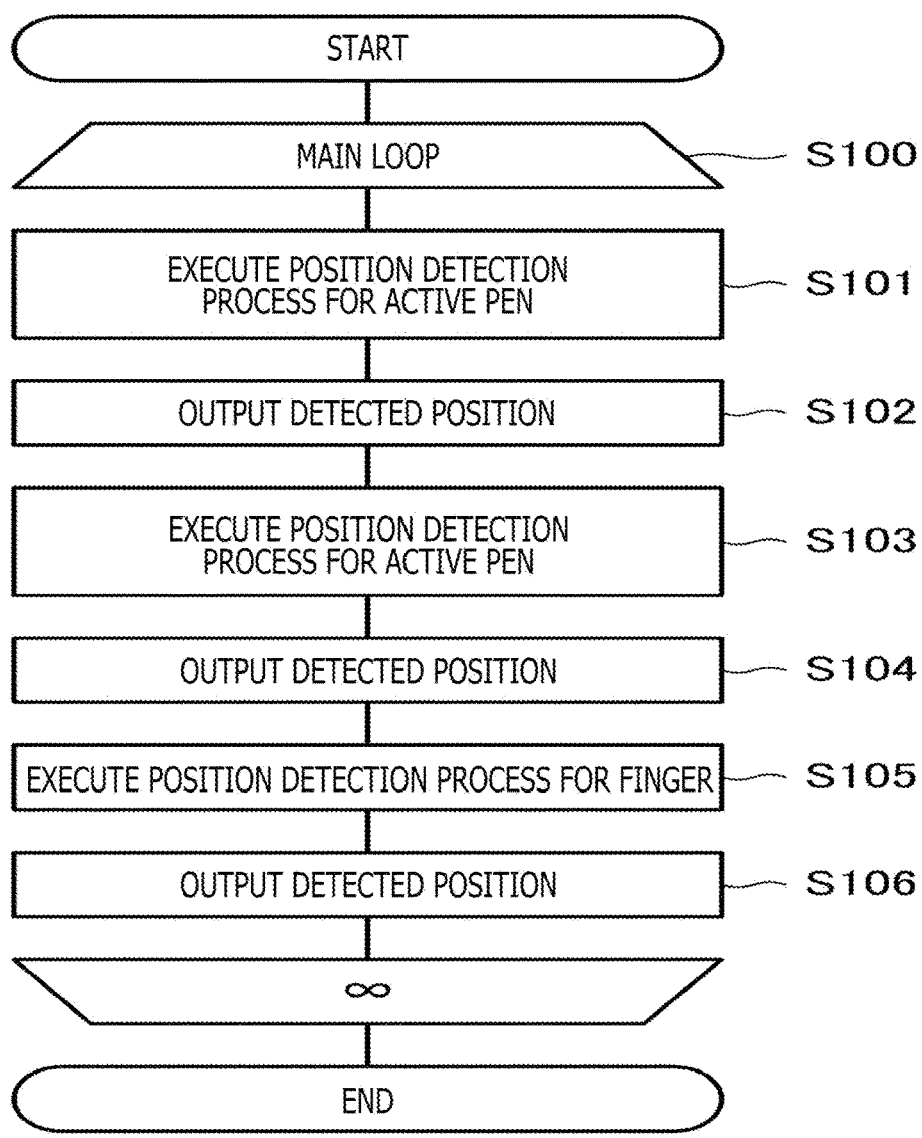
FIG. 2 is a flowchart depicting an outline of a pointer position detection process executed by a sensor controller included in a position detector according to a related art of the present disclosure.
Figure 3:
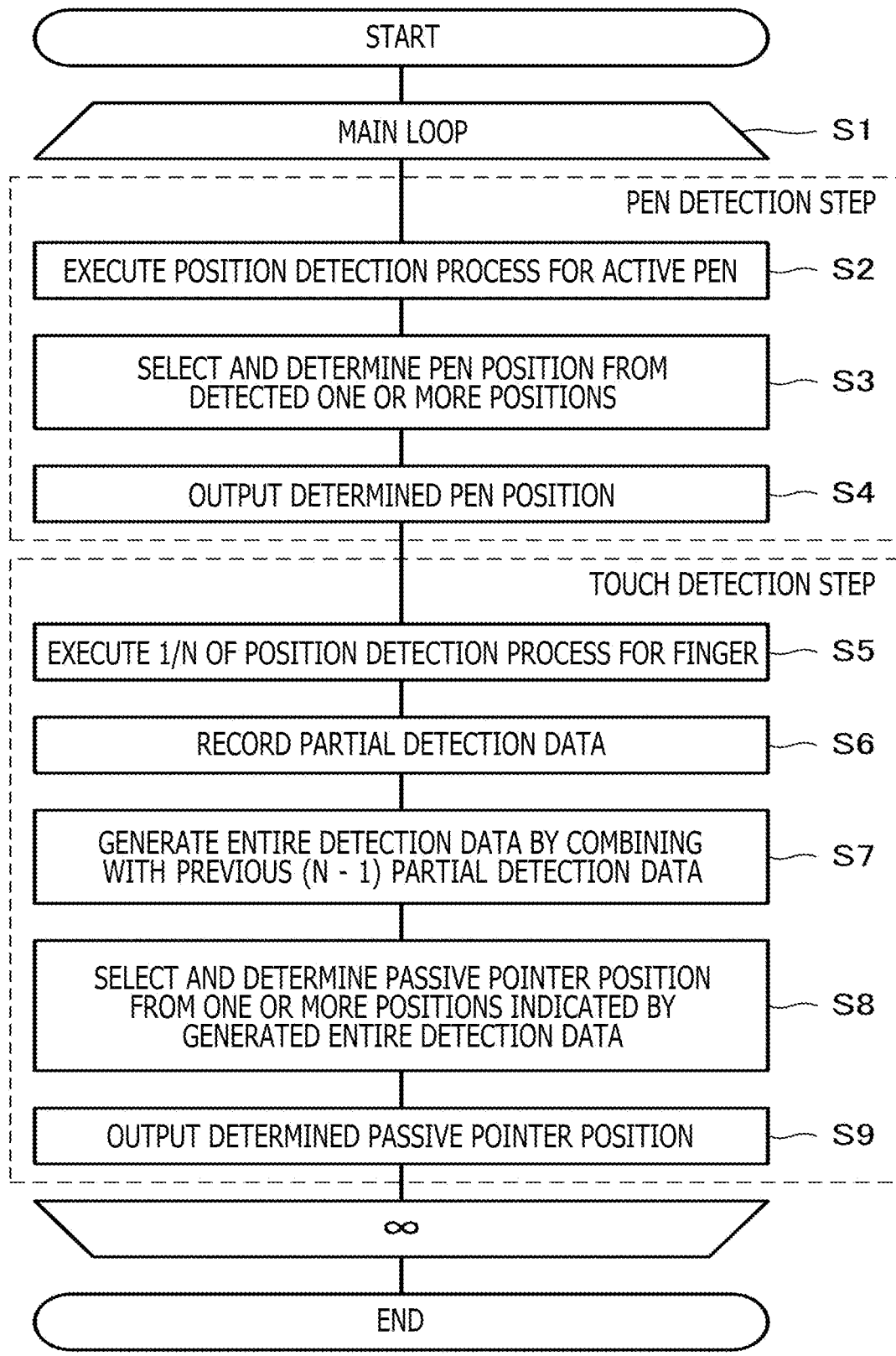
FIG. 3 is a flowchart depicting an outline of a pointer position detection process executed by a sensor controller according to an embodiment of the present disclosure.

Before describing details of the present embodiment, an outline of the present disclosure is touched upon herein with reference to FIGS. 2 and 3.

Initially, FIG. 2 is a flowchart depicting an outline of a pointer position detection process executed by a sensor controller (not depicted) included in a tablet according to a related art of the present disclosure. As depicted in this figure, the sensor controller according to the related art of the present disclosure is configured to repeatedly execute processing at S101 to S106 (S100).

The processing at S101 to S106 is specifically described. The sensor controller initially executes a position detection process for the active pen 2 (S101), and outputs a detected position to a host processor (not depicted) (S102). Subsequently, the sensor controller again executes the position detection process for the active pen 2 (S103), and outputs a detected position to the host processor (S104). The sensor controller then executes a position detection process for the finger 4 (S105), and outputs a detected position to the host processor (S106).

As described above, the position detection process for the active pen 2 is successively performed twice at S101 and S103 to obtain a sufficient detection rate for the active pen 2. In this case, however, detection intervals for the active pen 2 become irregular, in which condition, as described above, an unnatural drawing result may be produced in a drawing application operating based on an expectation that coordinate data indicating the active pen 2 and sequentially output from the sensor controller is transmitted at regular intervals in view of time, for example.

Moreover, as described above, a contact position of the hand 5 may be misdetected as a position of the active pen 2 during the position detection process for the active pen 2. On the other hand, the contact position of the active pen 2 or the hand 5 may be detected as the position of the finger 4 during the position detection process for the finger 4.

A process performed by a sensor controller 31 (see FIG. 4 referred to below) included in the tablet 3 according to the present embodiment is configured to overcome these problems. An outline of this process is hereinafter described with reference to FIG. 3.

FIG. 3 is a flowchart depicting an outline of a pointer position detection process executed by the sensor controller 31. As illustrated in this figure, the sensor controller 31 is configured to repeatedly execute processing at S2 to S9 (S1). S2 to S4 are associated with a pen detection process for detecting a pen position corresponding to the position of the active pen 2, while S5 to S9 are associated with a touch detection process for detecting a passive pointer position corresponding to the position of the finger 4.

The processing at S2 to S9 is now specifically described in comparison with the process depicted in FIG. 2. Initially, the position detection process at S2 is similar to the position detection process at S101. However, an output process for outputting a detected position is different from the corresponding process at S102 of the related art. More specifically, rather than outputting the position detected at S2 to a host processor 32 (see FIG. 4 referred to below) without change, the sensor controller 31 is configured to perform a process for selecting and determining a pen position from one or more detected positions (candidate pen positions) (hereinafter referred to as "pen position determination process") (S3), and outputting only the determined pen position to the host processor 32 (S4). Specific contents of the pen position determining process will be described below. The contact position of the hand 5 is excluded from output targets during this process, wherefore the sensor controller 31 can correctly identify the contact position of the active pen 2.

Subsequently, the sensor controller 31 performs a position detection process for the finger 4 at S5. In this case, the sensor controller 31 performs only 1/N of the position detection process executed at S105 by one process (S5). Specific contents of the 1/N process will be described below. At S5, only the 1/N process is executed by one process, wherefore the sensor controller 31 needs to combine N results to obtain the position of the finger 4. Accordingly, the sensor controller 31 records data indicating a partial detection result obtained by the 1/N process (hereinafter referred to as "partial detection data") (S6), and combines the partial detection data with (N−1) partial detection data previously recorded to generate data indicating the position of the finger 4 (hereinafter referred to as "entire detection data") (S7). In this case, the 1/N process is completed substantially in 1/N of the time required for completing the position detection process executed at S105, wherefore a sufficient detection rate of the active pen 2 can be obtained by the process configured as at S5 to S7 and performed by the sensor controller 31 without a necessity of successive execution of the position detection process for the active pen 2 twice as in the example of FIG. 2.

Thereafter, the sensor controller 31 performs a process for selecting and determining a passive pointer position from one or more positions indicated by the entire detection data generated at S7 (candidate touch positions) (hereinafter referred to as "passive pointer position determination process") (S8), and outputs only the determined passive pointer position to the host processor 32 (S9). The purpose for executing processing at S8 and S9 is similar to the purpose of S3 and S4. By this processing, the contact positions of the active pen 2 and the hand 5 are excluded from output targets, wherefore the sensor controller 31 can correctly identify the contact position of the finger 4. Specific contents of the passive pointer position determination process will be also described below. The pen position determination process and the passive pointer position determination process are also hereinafter collectively referred to as an "output position determination process."

Description of the outline of the present disclosure is now completed. The details of the present embodiment are hereinafter described again with reference to FIG. 1. In the following description, a general concept of a configuration of the position detection system 1 according to the present embodiment is initially described, and then details of the output position determination process and the 1/N process described above are sequentially described.

The active pen 2 is an electronic pen which operates by an active capacitance system. Not-depicted control circuitry and transmission and reception circuitry are provided inside the active pen 2. The control circuitry is configured to transmit and receive signals to and from the tablet 3 via the transmission and reception circuitry. A signal transmitted from the tablet 3 to the active pen 2 is hereinafter referred to as an uplink signal US, while a signal transmitted from the active pen 2 to the tablet 3 (pen signal) is hereinafter referred to as a downlink signal DS.

A pen electrode is provided at the distal end of the active pen 2. The transmission and reception section of the active pen 2 receives the uplink signal US and transmits the downlink signal DS via a capacitance formed between the pen electrode and a sensor 30 (see FIG. 4 referred to below)

provided on the touch surface 3a of the tablet 3. The pen electrode for receiving the uplink signal US and the pen electrode for transmitting the downlink signal DS may be constituted by different electrodes, or the same electrode.

The active pen 2 also includes writing pressure detection circuitry for detecting a pressure (writing pressure) applied to the pen tip, side switch state detection circuitry for detecting on-off state of a side switch provided on the side surface, a storage device (memory) for storing unique identifiers (IDs) allocated beforehand, and a power source device (battery) for supplying operation power of the active pen 2. The control circuitry of the active pen 2 is configured to control these components.

The downlink signal DS includes a position signal which is a burst signal at a predetermined frequency, and a data signal containing data to be transmitted from the active pen 2 to the tablet 3. The position signal is used to detect the position of the active pen 2 by the tablet 3. For example, data transmitted via the data signal includes data indicating a writing pressure detected by the writing pressure detection circuitry (writing pressure data), data indicating on-off state of the side switch and acquired by the side switch state detection circuitry (switch data), and unique IDs stored in the storage device, and is inserted into the data signal by the control circuitry.

The uplink signal US includes a predetermined start bit, and a command indicating an instruction issued from the tablet 3 to the active pen 2. The control circuitry of the active pen 2 is configured to extract the command from the received uplink signal US, decode the extracted command, and insert data corresponding to contents of the command into the data signal. In this manner, the tablet 3 is allowed to extract desired data from the active pen 2.

The tablet 3 is an electronic device which has both a function as a liquid crystal display device, and a function as a position detector for detecting a position of a pointer on the touch surface 3a. The touch surface 3a is provided on a liquid crystal display screen. Examples of the pointer detectable by the tablet 3 include both the active pen 2 and the finger 4 depicted in FIG. 1.

The sensor 30 including a plurality of sensor electrodes 30X and 30Y (sensor pattern) is provided inside the touch surface 3a, as will be described below in detail with reference to FIG. 4. The tablet 3 is configured to detect the position of the finger 4 (passive pointer position) by detecting a change of a capacitance included in the sensor 30, and detect the position of the active pen 2 (pen position) by detecting the foregoing position signal using the sensor 30.

The respective sensor electrodes 30X also function as common electrodes of the liquid crystal display device. During a pixel driving operation, a pixel driving voltage Vcom, which is a fixed potential, to the respective sensor electrodes 30X. The tablet 3 of a type which includes position detection sensor electrodes also functioning as liquid crystal display electrodes as in this example is generally called an "in-cell type." In case of the "in-cell type" tablet 3, the sensor electrodes 30X during pixel driving operation are difficult to use for position detection, wherefore position detection of the finger 4 or the active pen 2 is executed at an interval between pixel driving operations (e.g., horizontal blanking period and vertical blanking period). However, the present disclosure is similarly applicable to a tablet of a type (non-in-cell type) which includes the plurality of sensors 30X and 30Y separated from electrodes (common electrode and pixel electrode) of a liquid crystal display device.

Figure 4:
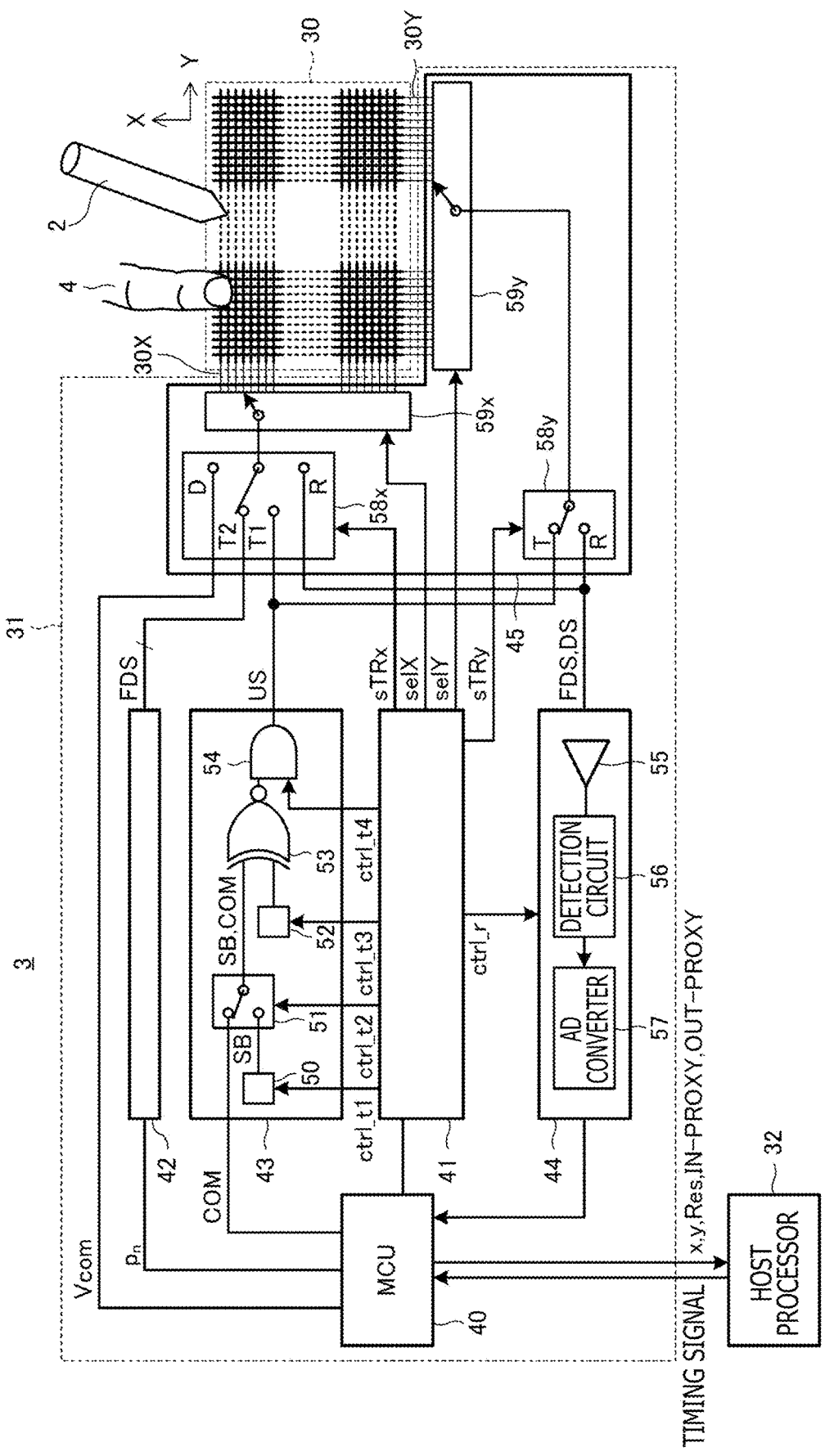
FIG. 4 is a diagram depicting a configuration of a tablet illustrated in FIG. 1.

FIG. 4 is a diagram depicting a configuration of the tablet 3. As depicted in this figure, the tablet 3 includes the sensor 30, the sensor controller 31, and the host processor 32.

The sensor 30 includes the plurality of sensor electrodes 30X and the plurality of sensor electrodes 30Y disposed in a matrix. The sensor electrodes 30X each extend in a Y direction and are disposed at regular intervals in an X direction crossing the Y direction at right angles, while the sensor electrodes 30Y each extend in the X direction and are disposed at regular intervals in the Y direction. According to the example presented herein, both the sensor electrodes 30X and 30Y are each constituted by a linear conductor. However, the sensor electrodes 30X and 30Y may be each constituted by a conductor having a different shape. For example, either the sensor electrodes 30X or the sensor electrodes 30Y may be constituted by a plurality of rectangular conductors two-dimensionally disposed to detect two-dimensional coordinates of the active pen 2.

The sensor controller 31 is configured to communicate with the active pen 2 (including position detection of active pen 2), and detect the position of the finger 4 in a time-divided manner by using the sensor 30 at intervals between pixel driving operations. The sensor controller 31 is further configured to supply the pixel driving voltage Vcom to each of the plurality of sensor electrodes 30X during pixel driving operation. The configuration of the sensor controller 31 is hereinafter described in more detail.

As depicted in FIG. 4, the sensor controller 31 includes a micro control unit (MCU) 40, a logic circuit 41, transmission circuits 42 and 43, a reception circuit 44, and a selection circuit 45.

The MCU 40 and the logic circuit 41 are control circuits for controlling transmission and reception operations of the sensor controller 31 by controlling the transmission circuits 42 and 43, the reception circuit 44, and the selection circuit 45. More specifically, the MCU 40 is a microprocessor which contains a memory (read-only memory (ROM) and random-access memory (RAM)) inside, and executes programs stored in the memory to perform operations. Operation timing of the MCU 40 is controlled according to a timing signal supplied from the host processor 32. Examples of operations performed by the MCU 40 include control an operation for the logic circuit 41, an operation for supplying the pixel driving voltage Vcom to the selection circuit 45, an operation for causing the transmission circuit 42 to output a finger detection signal FDS, an operation for supplying, to the transmission circuit 43, a command COM indicating contents of an instruction issued to the active pen 2, operation for detecting respective positions of the active pen 2 and the finger 4 (more specifically, coordinates x, y indicating positions within touch surface 3a) based on a digital signal supplied from the reception circuit 44, operation for decoding the digital signal supplied from the reception circuit 44 to acquire data Res (e.g., writing pressure data, switch data, and unique ID described above) transmitted from the active pen 2, and operation for determining a contact state of the active pen 2 in contact with the touch surface 3a based on writing pressure data contained in the data Res. The logic circuit 41 has a function of outputting control signals ctrl_t1 to ctrl_t4, and ctrl_r under control by the MCU 40.

The transmission circuit 42 is a circuit which generates the finger detection signal FDS under the control by the MCU 40, and supplies the finger detection signal FDS to the respective sensor electrodes 30X via the selection circuit 45. Specific contents of the finger detection signal FDS, and a method for supplying the finger detection signal FDS to the respective sensor electrodes 30X are herein described with reference to FIG. 5.

Figure 5:
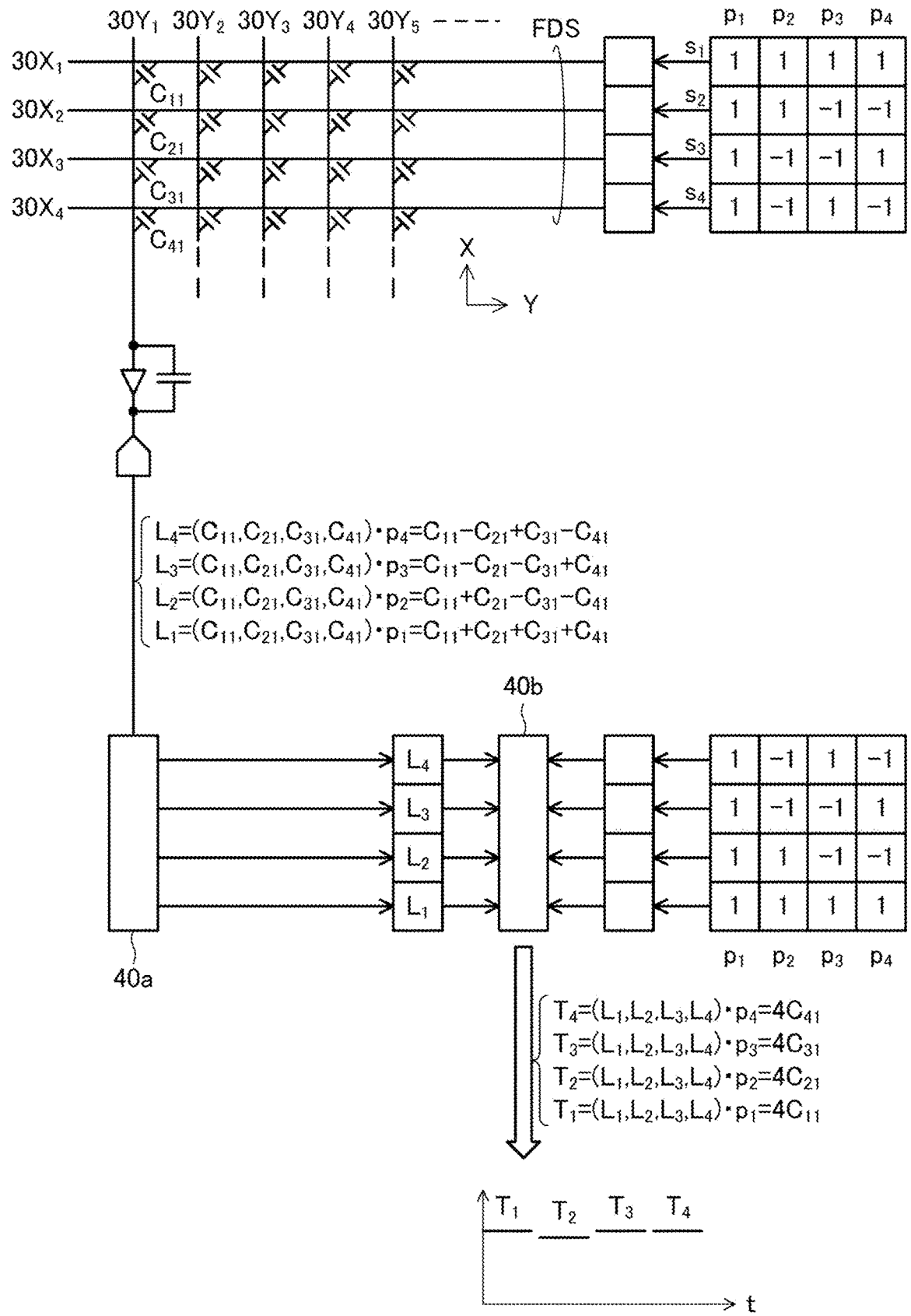
FIG. 5 is a diagram depicting a principle of a position detection process executed by an MCU depicted in FIG. 4 to detect a position of a finger.

FIG. 5 is a diagram depicting the principle of the position detection process executed by the MCU 40 to detect the position of the finger 4. This figure depicts a state before division of the position detection process for the finger 4 into the 1/N process depicted in FIG. 3, i.e., the position detection process for the finger 4 executed at S105 depicted in FIG. 2. This figure depicts only the four sensor electrodes 30X for simplifying the explanation, but there are actually provided a larger number of the sensor electrodes 30X. The description hereinafter continues on the assumption that the K sensor electrodes 30X are provided.

As depicted in FIG. 5, the finger detection signal FDS is constituted by K signals $S_1$ to $S_k$ which are K pulses each expressed as "1" or "−1," for example. The respective nth pulses (n=1 to K) of the signals $S_1$ to $S_k$ constitute a pulse group $P_n$. The respective pulses constituting the one pulse group $P_n$ are input from the transmission circuit 42 depicted in FIG. 4 to the respective sensor electrodes 30X in parallel via the selection circuit 45.

Now returning to FIG. 4, the transmission circuit 43 is a circuit which generates the uplink signal US under the control by the MCU 40 and the logic circuit 41, and supplies the uplink signal US to the selection circuit 45. As depicted in this figure, the transmission circuit 43 includes a pattern supply circuit 50, a switch 51, a code string retention circuit 52, a diffusion processing circuit 53, and a transmission guard circuit 54. It is assumed in the description herein that particularly the pattern supply circuit 50 among these components is included in the transmission circuit 43 according to the present embodiment. However, the pattern supply circuit 50 may be included in the MCU 40.

The pattern supply circuit 50 retains a start bit SB disposed at the head of the uplink signal US, and is configured to output the retained start bit SB in accordance with an instruction of the control signal ctrl_t1 supplied from the logic circuit 41, The switch 51 has a function of selecting either the pattern supply circuit 50 or the MCU 40 based on the control signal ctrl_t2 supplied from the logic circuit 41, and supplying output of the selected one to the diffusion processing circuit 53. When the switch 51 selects the pattern supply circuit 50, the start bit SB is supplied to the diffusion processing circuit 53. When the switch 51 selects the MCU 40, the command COM is supplied to the diffusion processing circuit 53.

The code string retention circuit 52 has a function of generating and retaining a diffusion code having a predetermined chip length and autocorrelation characteristics in response to the control signal ctrl_t3 supplied from the logic circuit 41. The diffusion code retained by the code string retention circuit 52 is supplied to the diffusion processing circuit 53.

The diffusion processing circuit 53 has a function of acquiring a transmission chip string having a predetermined chip length by modulating the diffusion code, which is retained by the code string retention circuit 52, based on a value supplied via the switch 51 (start bit SB or command COM). The diffusion processing circuit 53 supplies the acquired transmission chip string to the selection circuit 45 via the transmission guard circuit 54. The transmission guard circuit 54 has a function of inserting a guard period necessary for switching between the transmission operation and the reception operation (period when both transmission and reception are not performed) between the transmission period of the uplink signal US and the reception period of the downlink signal DS in response to the control signal ctrl_t4 supplied from the logic circuit 41.

The selection circuit 45 includes switches 58$x$ and 58$y$, and conductor selection circuits 59$x$ and 59$y$.

The switch 58$y$ is a switch element configured to connect a common terminal and either a T terminal or an R terminal. The common terminal of the switch 58$y$ is connected to the conductor selection circuit 59$y$. The T terminal is connected to an output end of the transmission circuit 43. The R terminal is connected to an input end of the reception circuit 44. The switch 58$x$ is a switch element configured to connect a common terminal and one of a T1 terminal, a T2 terminal, a D terminal, and an R terminal. In an actual configuration, the T2 terminal among these terminals is constituted by a collection of the same number of terminals as the number of the sensor electrodes 30X. The common terminal of the switch 58$x$ is connected to the conductor selection circuit 59$x$. The T1 terminal is connected to the output end of the transmission circuit 43. The T2 terminal is connected to an output end of the transmission circuit 42. The D terminal is connected to an output end of the MCU 40 which outputs the pixel driving voltage Vcom. The R terminal is connected to the input end of the reception circuit 44.

The conductor selection circuit 59$x$ is a switch element for selectively connecting the plurality of sensor electrodes 30X to the common terminal of the switch 58$x$. The conductor selection circuit 59$x$ is configured to allow simultaneous connection between a part or all of the plurality of sensor electrodes 30X and the common terminal of the switch 58$x$. In a state of connection between the T2 terminal and the common terminal within the switch 58$x$, the conductor selection circuit 59$x$ connects the plurality of terminals constituting the T2 terminal and the plurality of sensor electrodes 30X with one-to-one correspondence.

The conductor selection circuit 59$y$ is a switch element for selectively connecting the plurality of sensor electrodes 30Y to the common terminal of the switch 58$y$. Similarly to the conductor selection circuit 59$x$, the conductor selection circuit 59$y$ is configured to allow simultaneous connection between a part or all of the plurality of sensor electrodes 30Y and the common terminal of the switch 58$y$.

Four control signals sTRX, sTRy, selX, and selY are supplied from the logic circuit 41 to the selection circuit 45. More specifically, the control signal sTRx is supplied to the switch 58$x$. The control signal sTRy is supplied to the switch 58$y$. The control signal selX is supplied to the conductor selection circuit 59$x$. The control signal selY is supplied to the conductor selection circuit 59$y$. The logic circuit 41 achieves transmission of the uplink signal US or the finger detection signal FDS, application of the pixel driving voltage Vcom, and reception of the downlink signal SD or the finger detection signal FDS by controlling the selection circuit 45 using the control signals sTRx, sTRy, selX, and selY.

More specifically, at the time of transmission of the uplink signal US, the logic circuit 41 controls the selection circuit 45 to simultaneously connect all of the plurality of sensor electrodes 30Y to the transmission circuit 43. In this case, the uplink signal US is simultaneously transmitted from all of the plurality of sensor electrodes 30Y. Accordingly, the active pen 2 located at any position on the touch surface 3$a$ is capable of receiving the uplink signal US.

At the time of reception of the foregoing position signal included in the downlink signal DS, the logic circuit 41 sequentially selects the plurality of sensor electrodes 30X and 30Y one by one, and controls the selection circuit 45 to connect the selected sensor electrodes 30X and 30Y to the reception circuit 44. In this manner, the same number of position signals as the number of the sensor electrodes 30X and 30Y are sequentially supplied to the reception circuit 44. The MCU 40 is configured to detect the position of the active pen 2 based on levels of the position signals supplied to the reception circuit 44 in this manner. This configuration will be described below in detail.

More specifically, the MCU 40 determines a level of a position signal at each of intersections of the plurality of sensor electrodes 30X and 30Y based on a digital signal (described below) supplied from the reception circuit 44. Then, the MCU 40 detects the position of the active pen 2 based on respective levels thus determined. More specifically, a region included in the touch surface 3a and exhibiting higher levels of the position signals than a predetermined value, and detects a center position, for example, of the region as the position of the active pen 2.

At the time of reception of the foregoing data signal included in the downlink signal DS, the MCU 40 initially selects one or more of the plurality of sensor electrodes 30X and 30Y. This selection is executed based on the position of the active pen 2 detected from the position signal received immediately before. Thereafter, the logic circuit 41 controls the selection circuit 45 to connect the selected sensor electrodes 30X and 30Y to the reception circuit 44. In this manner, the data signal transmitted from the active pen 2 can be supplied to the reception circuit 44.

At the time of transmission of the finger detection signal FDS, the logic circuit 41 repeatedly performs, for the sensor electrodes 30Y, an operation for selecting the one sensor electrode 30Y, and causing the transmission circuit 42 to sequentially input the foregoing pulse groups $p_1$ to $p_k$ to the respective sensor electrodes 30X in cooperation with the MCU 40. More specifically, the logic circuit 41 initially controls the selection circuit 45 to connect the plurality of terminals constituting the T2 terminal of the switch 58x to the plurality of sensor electrodes 30X with one-to-one correspondence. Thereafter, the logic circuit 41 sequentially selects the plurality of sensor electrodes 30Y one by one while maintaining this state, and controls the selection circuit 45 to connect the selected sensor electrode 30Y to the reception circuit 44.

The MCU 40 also sequentially reads the pulse groups $p_1$ to $p_k$ from the memory one pulse group each during selection of the one sensor electrode 30Y, and supplies K pulses constituting the read pulse group to the transmission circuit 42 for each of the reading. The transmission circuit 42 inputs the K pulses thus supplied to the K sensor electrodes 30X in parallel. A level of a digital signal supplied from the reception circuit 44 as a result of this control is a level reflecting changes of capacitances formed at respective intersections of the selected sensor electrode 30Y and the respective sensor electrodes 30X. The MCU 40 is therefore configured to detect the position of the finger 4 based on the levels of the digital signals supplied from the reception circuit 44.

The position detection process executed by the MCU 40 to detect the position of the finger 4 is herein described in more detail again with reference to FIG. 5. The following description is presented on the assumption that the number of the sensor electrodes 30X is four (i.e., K=4). However, the same description is applicable even when the number of the sensor electrodes 30X is three or smaller or five or larger.

When the number of the sensor electrodes 30X is four, each of signals $s_1$ to $s_k$ is constituted by a pulse expressed by four numerals of "1" or "−1." More specifically, as depicted in FIG. 5, the signal $s_1$ is constituted by "1, 1, 1, 1," the signal $s_2$ is constituted by "1, 1, −1, −1," the signal $s_3$ is constituted by "1, −1, −1, 1," and the signal $s_4$ is constituted by "1, −1, 1, −1."

The MCU 40 functionally includes a shift register 40a and a correlator 40b. The shift register 40a is a first in first out (FIFO) type storage unit, and is configured to store the same number (i.e., K) of data as the number of the sensor electrodes 30X. When storing new data in the shift register 40a, data stored K times before is deleted. As described above, the MCU 40 and the logic circuit 41 repeated performs the operation for the respective sensor electrodes 30Y, i.e., the operation for selecting the one sensor electrode 30Y, and causing the transmission circuit 42 to sequentially input the pulse groups $p_1$ to $p_4$ to the respective sensor electrodes 30X. As a result, four levels $L_1$ to $L_4$ corresponding to the respective pulse groups $p_1$ to $p_4$ sequentially appear in the selected sensor electrode 30Y. The MCU 40 sequentially acquires the levels $L_1$ to $L_4$ appearing in the sensor electrodes 30Y in this manner via the reception circuit 44, and stores the acquired levels in the shift register 40a every time the levels are acquired.

Specific contents of the levels $L_1$ to $L_4$ at the time of selection of the sensor electrode $30Y_1$ depicted in FIG. 5 are now detailed by way of example. In the following description, it is assumed that capacitances $C_{11}$ to $C_{41}$ are formed between the sensor electrode $30Y_1$ and the four sensor electrodes $30X_1$ to $30X_4$, respectively.

Initially, the level $L_1$ corresponding to the pulse group $p_1$ and stored in the register 40a is an inner product of a vector $(C_{11}, C_{21}, C_{31}, C_{41})$ and a vector $(1, 1, 1, 1)$ indicating the pulse group $p_1$. This inner product is calculated as $C_{11}+C_{21}+C_{31}+C_{41}$ as depicted in FIG. 5. Similarly, the level $L_2$ corresponding to the pulse group $p_2$ and stored in the register 40a is an inner product of the vector $(C_{11}, C_{21}, C_{31}, C_{41})$ and a vector $(1, 1, −1, −1)$ indicating the pulse group $p_2$, and is calculated as $C_{11}+C_{21}-C_{31}-C_{41}$. The level $L_3$ corresponding to the pulse group $p_3$ and stored in the register 40a is an inner product of the vector $(C_1, C_{21}, C_{31}, C_{41})$ and a vector $(1, −1, −1, 1)$ indicating the pulse group $p_3$, and is calculated as $C_{11}-C_{21}-C_{31}+C_{41}$. The level $L_4$ corresponding to the pulse group $p_4$ and stored in the register 40a is an inner product of the vector $(C_1, C_{21}, C_{31}, C_{41})$ and a vector $(1, −1, 1, −1)$ indicating the pulse group $p_4$, and is calculated as $C_{11}-C_{21}+C_{31}-C_{41}$.

The MCU 40 sequentially calculates correlation values $T_1$ to $T_4$ of the four pulse groups $p_1$ to $p_4$ correlating with the levels $L_1$ to $L_4$ accumulated in the shift register 40a by using the correlator 40b. As depicted in FIG. 5, $4C_{11}$, $4C_{21}$, $4C_{31}$, and $4C_{41}$ are specific contents of the correlation values $T_1$ to $T_4$ thus calculated. In this case, the correlation values $T_1$ to $T_4$ reflect changes of capacitances formed at the intersections of the sensor electrodes $30X_1$ to $30X_4$ and the sensor electrode $30Y_1$. Accordingly, the MCU 40 can detect the position of the finger 4 by referring to the correlation values $T_1$ to $T_4$ calculated for the respective sensor electrodes 30Y. More specifically, a region included in the touch surface 3a and exhibiting a predetermined change of capacitances or more is determined, and a center position of the region, for example, is detected as the position of the finger 4.

The detailed description of the position detection process executed by the MCU 40 for detecting the position of the finger 4 is now completed. Again as depicted in FIG. 4, the logic circuit 41 controls the switch 58x to connect the D terminal to the common terminal at the time of application of the pixel driving voltage Vcom. As a result, the pixel driving voltage Vcom is supplied to each of the plurality of sensor electrodes 30X to allow execution of the pixel driving operation.

The reception circuit 44 is a circuit which receives the downlink signal DS transmitted from the active pen 2, or the finger detection signal FDS transmitted from the transmission circuit 42 in response to the control signal ctrl_r of the logic circuit 41. More specifically, the reception circuit 44 includes an amplification circuit 55, a detection circuit 56, and an analog-digital (AD) converter 57.

The amplification circuit 55 amplifies and outputs the downlink signal DS supplied from the selection circuit 45 or the finger detection signal FDS. The detection circuit 56 is a circuit which generates a voltage corresponding to a level of an output signal received from the amplification circuit 55. The AD converter 57 is a circuit which generates a digital signal by sampling voltages output from the detection circuit 56 at predetermined time intervals. The digital signal output from the AD converter 57 is supplied to the MCU 40.

The MCU 40 detects the positions of the finger 4 and the active pen 2 (coordinates x, y), and acquires data Res transmitted from the active pen 2 based on the digital signal thus supplied. More specifically, concerning the position of the finger 4, the MCU 40 acquires levels $L_1$ to $L_k$ corresponding to the pulse groups $p_1$ to $p_k$ for each of the sensor electrode 30Y based on the supplied digital signals. The position of the finger 4 is detected from the levels 11 to $L_k$ by the method described above with reference to FIG. 5. Concerning the position of the active pen 2, as described above, the MCU 40 determines levels of position signals at respective intersections of the plurality of sensor electrodes 30X and 30Y based on the supplied digital signals, and detects the position of the active pen 2 based on the determined levels. Concerning the data Res, the MCU 40 decodes the digital signals supplied from the reception circuit 44 to acquire the data Res. The MCU 40 is configured to output the positions (coordinates x, y) and the data Res thus detected to the host processor 32.

The MCU 40 also determines a contact state between the active pen 2 and the touch surface 3a based on writing data included in the acquired data Res. When it is determined that the active pen 2 is newly brought into contact with the touch surface 3a (i.e., writing pressure changes from 0 to positive value), pen-down information IN-PROXY is output to the host processor 32. When it is determined that the active pen 2 is separated from the touch surface 3a (i.e., writing pressure changes from positive value to 0), pen-up information OUT-PROXY is output to the host processor 32. The pen-down information IN-PROXY and the pen-up information OUT-PROXY thus output are used by the host processor 32 to recognize a start and an end of a stroke.

The description of the outline of the configuration of the position detection system 1 according to the present embodiment is now completed. Detailed contents of the output position determination process and the 1/N process described above are sequentially touched upon herein.

Initially, the output position determination process is detailed.

FIG. 6A is a pen position table used for the output position determination process according to the present embodiment, while FIG. 6B is a touch positon table used for the output position determination process according to the present embodiment. After detecting one or more positions by the process described above for the active pen 2 or the finger 4, the MCU 40 uses these tables to determine a position to be output to the host processor 32.

As depicted in FIG. 6A, the pen position table is a table which stores a candidate pen position cP[i], a decided pen position fP[i], and a valid flag in association with each other. The touch position table is a table which stores a candidate touch position cT[j], a decided touch position fT[j], a valid flag, and a region type in association with each other. In these tables, i and j are 0 or integers larger than 0. The candidate pen position cP[i] is a position of the active pen 2 detected at S2 in FIG. 3, while the candidate touch position cT[j] is a position of the finger 4 indicated by entire detection data generated at S7 in FIG. 3. Other parameters will be explained below.

Before touching upon specific contents of the output position determination process, a concept of this process is herein described in detail again with reference to FIG. 1.

In the example depicted in FIG. 1, three types of objects of the active pen 2, the finger 4, and the hand 5 holding the active pen 2 are in contact with the touch surface 3a. It is preferable, in theory, that only the finger 4 of these objects is detected in the position detection process for the finger 4. However, there is a possibility that the active pen 2 and the hand 5 are also detected. This possibility is produced by the fact that changes of capacitances of the sensor electrodes 30X and 30Y may include changes of capacitances formed between the sensor electrodes 30X and 30Y and the active pen 2 or the hand 5. In the position detection process for the active pen 2, it is preferable, in theory, that only the active pen 2 is detected. However, there is a possibility that the hand 5 is also detected. This possibility is produced by the fact that the downlink signal DS is transmitted from the active pen 2 to the tablet 3 not only via a route (arrow A in FIG. 1) reaching the touch surface 3a from the pen tip of the active pen 2, but also via a route (arrow B in FIG. 1) passing through the hand 5.

After acquiring one or more candidate touch positions by processing depicted at S5 to S7 in FIG. 3 (or processing depicted at S105 in FIG. 2), the MCU 40 initially determines an extent of each candidate touch position (extent of region exhibiting predetermined change amount of capacitance or more). The MCU 40 then excludes a candidate touch position having an extent determined to have a predetermined size or more from output targets. In case of the example depicted in FIG. 1, the contact position of the hand 5 is herein excluded. Thereafter, the MCU 40 determines whether or not each of the remaining candidate touch positions has been detected as the position of the active pen 2 in the position detection process for the active pen 2 executed immediately before by referring to the pen position table, and excludes the candidate touch position already detected from the output targets. In case of the example depicted in FIG. 1, the contact position of the active pen 2 is herein excluded. In this manner, the candidate touch position remaining until the end is determined as a position to be output to the host processor 32 at S9 in FIG. 3. In this case, the contact position of the hand 5 and the contact position of the active pen 2 are excluded from the output targets, wherefore only the position of the finger 4 can be correctly selected and output.

After acquiring one or more candidate pen positions by processing depicted at S2 in FIG. 3, the MCU 40 determines whether or not each of the acquired one or more candidate pen positions has been detected as the position of the finger 4 or the hand 5 in the position detection process for the finger 4 executed immediately before by referring to the touch position table. Thereafter, the MCU 40 excludes the candidate pen position determined to have been detected as the position of the hand 5 from output targets. In case of the example depicted in FIG. 1, the contact position of the hand 5 is herein excluded. The candidate pen position not excluded herein, i.e., the candidate pen position determined not to have been detected, and the candidate pen position determined to have been detected as the finger 4 are determined as positions to be output to the host processor 32 at S4 in FIG. 3. In this case, the contact position of the hand 5 is excluded from the output targets, wherefore only the position of the active pen 2 can be correctly selected and output.

According to the position detection process of the present embodiment, therefore, the positions of the active pen 2 and the finger 4 can be correctly selected and output to the host processor 32. Specific contents of the output position determination process performed by the MCU 40 with reference to the pen position table and the touch position table are hereinafter described in detail.

Figure 7:
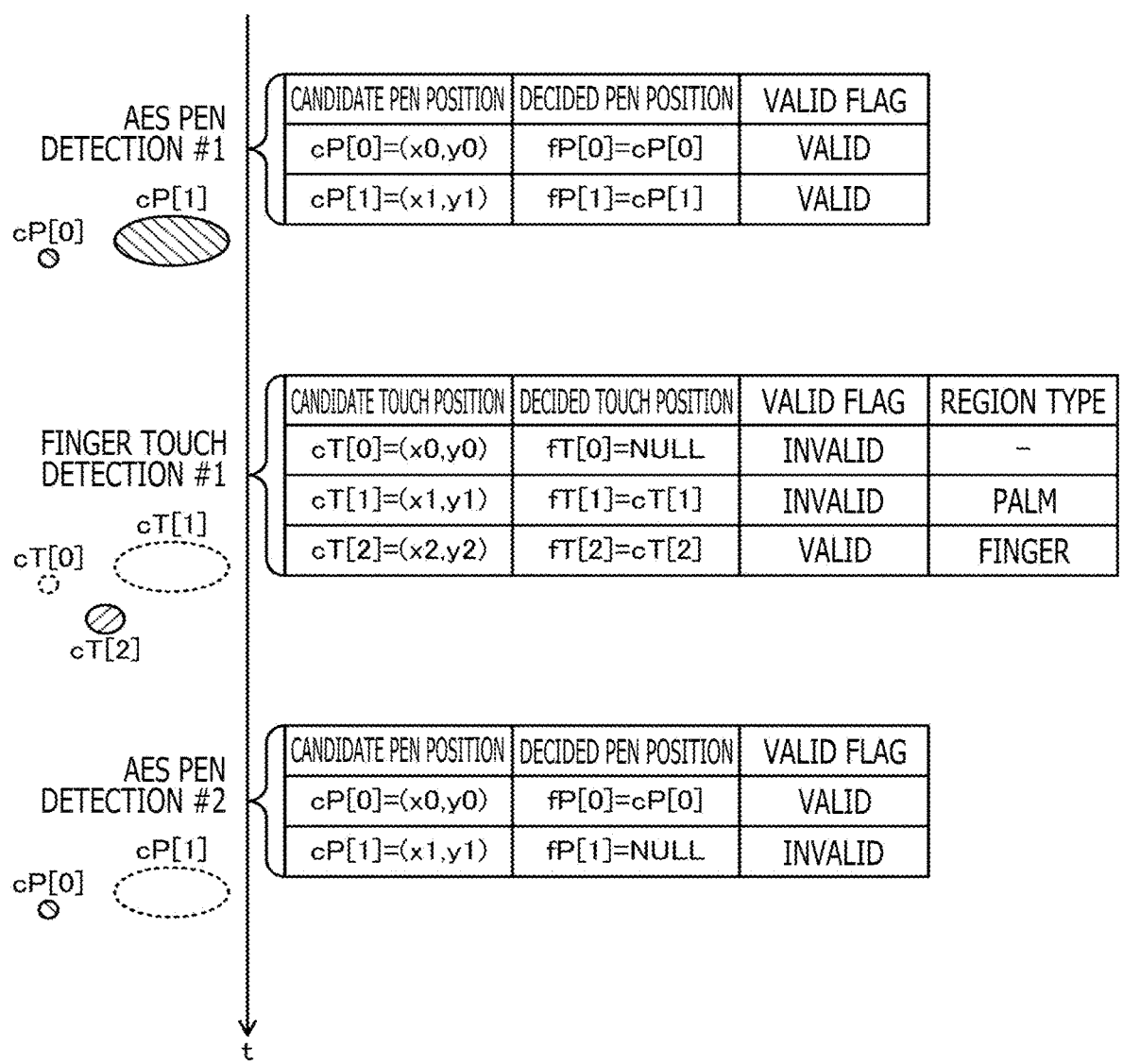
FIG. 7 is a diagram depicting an example of the output position determination process performed by the MCU with reference to the pen position table and the touch position table depicted in FIGS. 6A and 6B.
Figure 8:
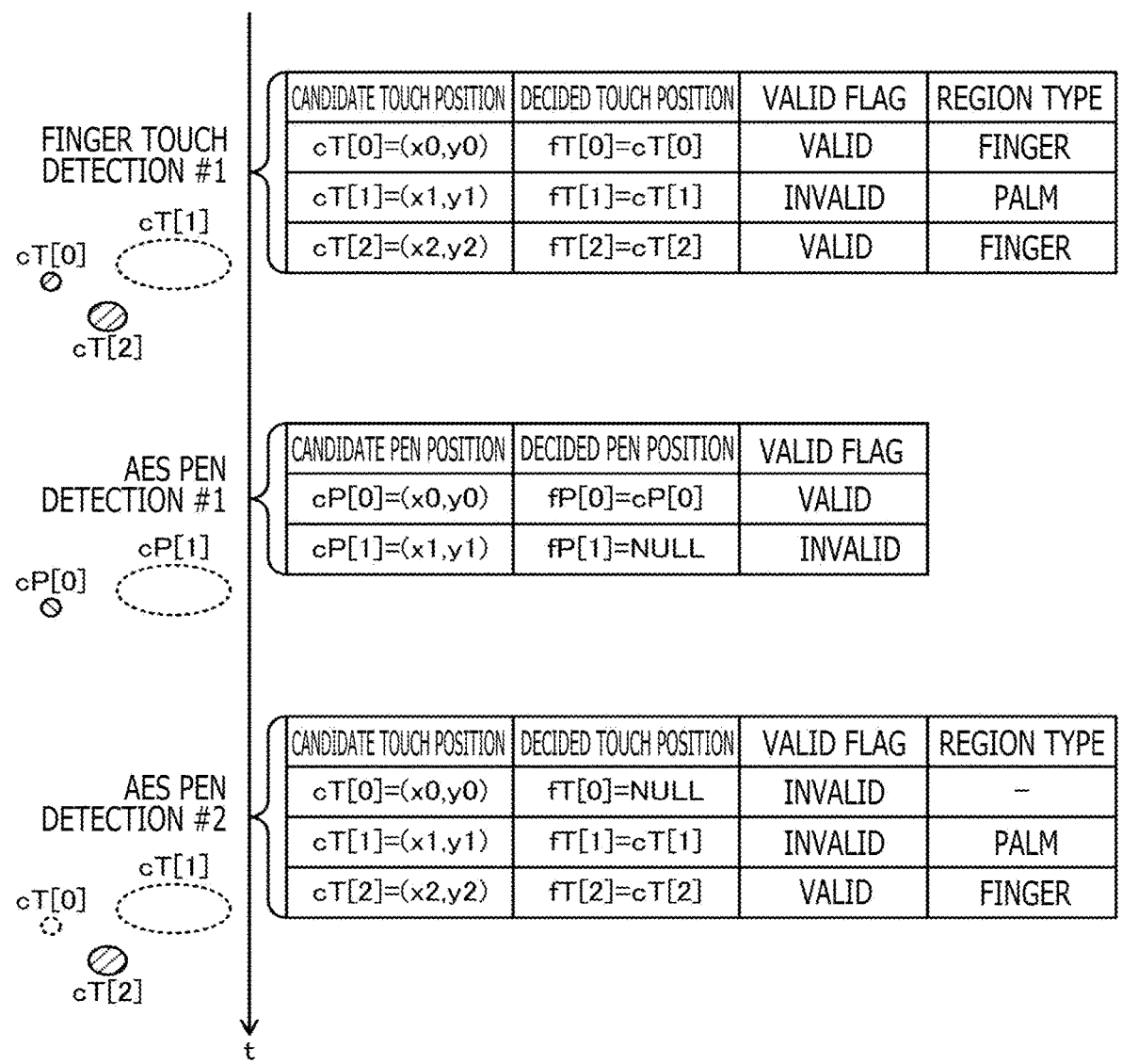
FIG. 8 is a diagram depicting an example of the output position determination process performed by the MCU with reference to the pen position table and the touch position table depicted in FIGS. 6A and 6B.

Each of FIGS. 7 and 8 depicts an example of the output position determination process performed by the MCU 40 with reference to the pen position table and the touch position table.

FIG. 7 depicts an example of a change of each of the pen position table and the touch position table in time series when position detection of the active pen 2 is first performed. The MCU 40 in this example stores two candidate pen positions cP[0] and cP[1] in a pen position candidate table as a result of the first position detection process for the active pen 2. Subsequently, the MCU 40 sets corresponding decided pen positions fP[0] and fP[1] to the candidate pen positions cP[0] and cP[1], respectively, and respective valid flags to "valid." The MCU 40 supplies the respective decided pen positions fP[0] and fP[1] for each of which "valid" has been set to the host processor 32 as detected positions of the active pen 2. However, supply of the detected positions to the host processor 32 may be omitted herein.

Subsequently, the MCU 40 performs the first position detection process for the finger 4, and stores three candidate touch positions cT[0] to cT[2] in a touch position candidate table as a result of the position detection process. The MCU 40 then initially detects each extent of the candidate touch positions cT[0] to cT[2] (extent of region exhibiting predetermined change amount of capacitance or more). Assuming herein that only the candidate touch position cT[1] has a detected extent of a predetermined size or more, and that the other candidate touch positions cT[0] and cT[2] each have a detected extent smaller than the predetermined size, the MCU 40 sets the decided touch position fT[1] to the candidate touch position cT[1], the corresponding valid flag to "invalid," and the corresponding region type to "palm."

Thereafter, the MCU 40 determines whether or not each of the candidate touch positions cT[0] and cT[2] having the detected area smaller than the predetermined size is substantially equal to each of the decided pen positions fP[0] and fP[1] stored in the pen position candidate table. The state "substantially equal" herein refers to a state in which a distance between one position and the other position is a distance not longer than a predetermined value sufficiently smaller than the extent of the touch surface 3a. It is preferable that a specific value of this predetermined value is equivalent to the sum of lengths of several pixels, for example.

In case of the example depicted in FIG. 7, the candidate touch position cT[0] is determined to be substantially equal to the decided pen position fP[0], while the candidate touch position cT[2] is determined not to be equivalent to each of the decided pen positions fP[0] and fP[1]. In this case, the MCU 40 sets the decided pen position fP[2] to the candidate touch position cT[2], the corresponding valid flag to "valid," and the corresponding region type to "finger." However, the MCU 40 sets nothing for the decided pen position fP[0] (maintaining initial value NULL), and sets the corresponding valid flag to "invalid." The MCU 40 maintains an initial value of the region type corresponding to the decided pen position fP[0] (sets nothing for region type).

After setting the touch position candidate table as described above, the MCU 40 supplies only the decided touch position fT[2] having the valid flag for which "valid" has been set to the host processor 32 as the detected position of the finger 4. The candidate touch position cT[0] located near the decided pen position fP[0] and having the detected extent smaller than the predetermined size is not supplied to the host processor 32.

Subsequently, the MCU 40 once resets the pen position candidate table, and then performs the second position detection process for the active pen 2. Assuming herein that none of the active pen 2, the finger 4, and the hand 5 shifts on the touch surface 3a, the two candidate pen positions cP[0] and cP[1] are stored in the pen candidate table as a result of the position detection similarly to the first process.

Thereafter, the MCU 40 determines whether or not each of the acquired candidate pen positions cP[0] and cP[1] is substantially equal to each of the decided touch positions fT[0] to fT[2] stored in the touch position candidate table. In case of the example depicted in FIG. 7, the decided touch position fT[0] has been set to NULL at this time. Accordingly, whether or not each of the acquired candidate pen positions cP[0] and cP[1] is substantially equal to each of the decided touch positions fT[1] and fT[2] is actually determined.

In case of the example depicted in FIG. 7, the candidate pen position cP[1] is determined to be substantially equal to the decided touch position fT[1], while the candidate pen position cP[0] is determined not to be equal to each of the decided touch positions fT[0] to fT[2]. In this case, the MCU 40 initially sets the decided pen position fP[0] to the candidate pen position cP[0], and the corresponding valid flag to "valid." On the other hand, concerning the candidate pen position cP[1], the MCU 40 determines which of "palm" and "finger" is the region type of the corresponding decided touch position fT[1]. When the determination result indicates "palm," the MCU 40 sets the decided pen position fP[1] to NULL, and the corresponding valid flag to "invalid." When the determination result is "finger," the MCU 40 sets the decided pen position fP[1] to the candidate pen position cP[1], and the corresponding valid flag to "valid." In case of the example depicted in FIG. 7, the region type of the decided touch position fT[1] is "palm," wherefore the corresponding decided pen position fP[1] is set to NULL.

FIG. 8 depicts an example of a change of each of the pen position table and the touch position table in time series when position detection of the finger 4 is first performed. The MCU 40 in this example stores three candidate pen positions cT[0] to cT[2] in a pen position candidate table as a result of the first position detection process for the finger 4. Subsequently, the MCU 40 detects each extent of the candidate touch positions cT[0] to cT[2] (extent of region exhibiting predetermined change amount of capacitance or more). Assuming herein that only the candidate touch position cT[1] has a detected extent of a predetermined size or more similarly to the example depicted in FIG. 7, the MCU 40 initially sets the decided touch position fT[1] to the candidate touch position cT[1], the corresponding valid flag to "invalid," and the corresponding region type to "palm." Concerning the other two candidate touch positions cT[0] and cT[2], the MCU 40 sets the decided touch positions fT[0] and fT[2] to the candidate touch positions cT[0] and cT[2], respectively, the corresponding valid flags to "valid," and the corresponding region types to "finger." The MCU 40 supplies each of the decided touch positions fT[0] and fT[2] for which "valid" has been set to the host processor 32 as detected positions of the finger 4. However, supply of the detected positions to the host processor 32 may be omitted in this stage.

Subsequently, the MCU 40 performs the first position detection process for the active pen 2, and stores the two candidate pen positions cP[0] and cP[1] in the pen position candidate table as a result of the process. The MCU 40 then determines whether or not each of the acquired candidate pen positions cP[0] and cP[1] is substantially equal to each of the decided pen positions fT[0] to fT[2] stored in the touch position candidate table.

In case of the example depicted in FIG. 8, the candidate pen position cP[0] is determined to be substantially equal to the decided touch position fT[0], while the candidate pen position cP[1] is determined to be substantially equal to the decided touch position fT[1]. Subsequently, the MCU 40 determines which of "palm" and "finger" is the region type of each of the decided touch positions fT[0] and fT[1]. In case of the example depicted in FIG. 8, the region type of the decided touch position fT[0] is "finger," while the region type of the decided touch position fT[1] is "palm."

Concerning the candidate pen positon cP[1] for which "palm" is determined as the region type of the corresponding decided touch position fT[1], the MCU 40 sets the decided pen position fP[1] to NULL, and the corresponding valid flag to "invalid." Concerning the candidate pen positon cP[0] for which "finger" is determined as the region type of the corresponding decided touch position fT[0], the MCU 40 sets the decided pen position fP[0] to the candidate pen position cP[0], and the corresponding valid flag to "valid." This processing indicates that an error has been made in the position detection process for the finger 4. The MCU 40 supplies the decided pen position fP[0] for which "valid" has been set to the host process 32 as the detection position of the active pen 2.

Subsequently, the MCU 40 once resets the touch position candidate table, and then performs the second position detection process for the finger 4. Assuming herein that none of the active pen 2, the finger 4, and the hand 5 shifts on the touch surface 3a, the three candidate pen positions cT[0] to cT[2] are stored in the touch candidate table as a result of the position detection similarly to the first process.

After storing the candidate touch positions cT[0] to cT[2] in the touch position candidate table, the MCU 40 subsequently detects each extent of the candidate touch positions cT[0] to cT[2] (extent of region exhibiting predetermined change amount of capacitance or more). Assuming herein that only the candidate touch position cT[1] has a detected extent of the predetermined size or more similarly to the first detection, the MCU 40 sets the decided touch position fT[1] to the candidate touch position cT[1], the corresponding valid flag to "invalid," and the corresponding region type to "palm." This processing is similar to the processing performed after the first position detection of the finger 4.

Subsequently, the MCU 40 determines whether or not each of the remaining candidate touch positions cT[0] and cT[2] is substantially equal to each of the decided pen positions fP[0] and fP[1] stored in the pen position candidate table. In case of the example depicted in FIG. 8, the candidate touch position cT[0] is determined to be substantially equal to the decided pen position fP[0], and the candidate touch position cT[2] is determined not to be equal to each of the decided pen positions fP[0] and fP[1] based on this determination. In this case, the MCU 40 sets the decided pen position fP[2] to the candidate touch position cT[2], the corresponding valid flag to "valid," and the corresponding region type to "finger." However, the MCU 40 sets nothing for the decided pen position fP[0] (maintaining initial value NULL), and sets the corresponding valid flat to "invalid." The MCU 40 maintains an initial value of the region type corresponding to the decided pen position fP[0] (sets nothing for region type).

After setting the touch position candidate table in this manner, the MCU 40 supplies only the decided touch position fT[2] for which the corresponding valid flag is set to "valid" to the host processor 32 as the detected position of the finger 4.

As described above, the output position determination process according to the present embodiment can exclude the contact position of the hand 5 from the output targets during the pen position determination process, and exclude the contact positions of the active pen 2 and the hand 5 from the output targets during the passive pointer position determination process. Accordingly, even when the contact position of the active pen 2 and the contact position of the finger 4 are mutually misrecognized in the stage of the candidate pen position and the candidate touch position, the positions of the active pen 2 and the finger 4 can be correctly output to the host processor 32 in the final stage.

The output position determination process performed by the MCU 40 using the pen position table and the touch position table is now described in more detail with reference to the process flow of the MCU 40 again from a different viewpoint.

Figure 9:
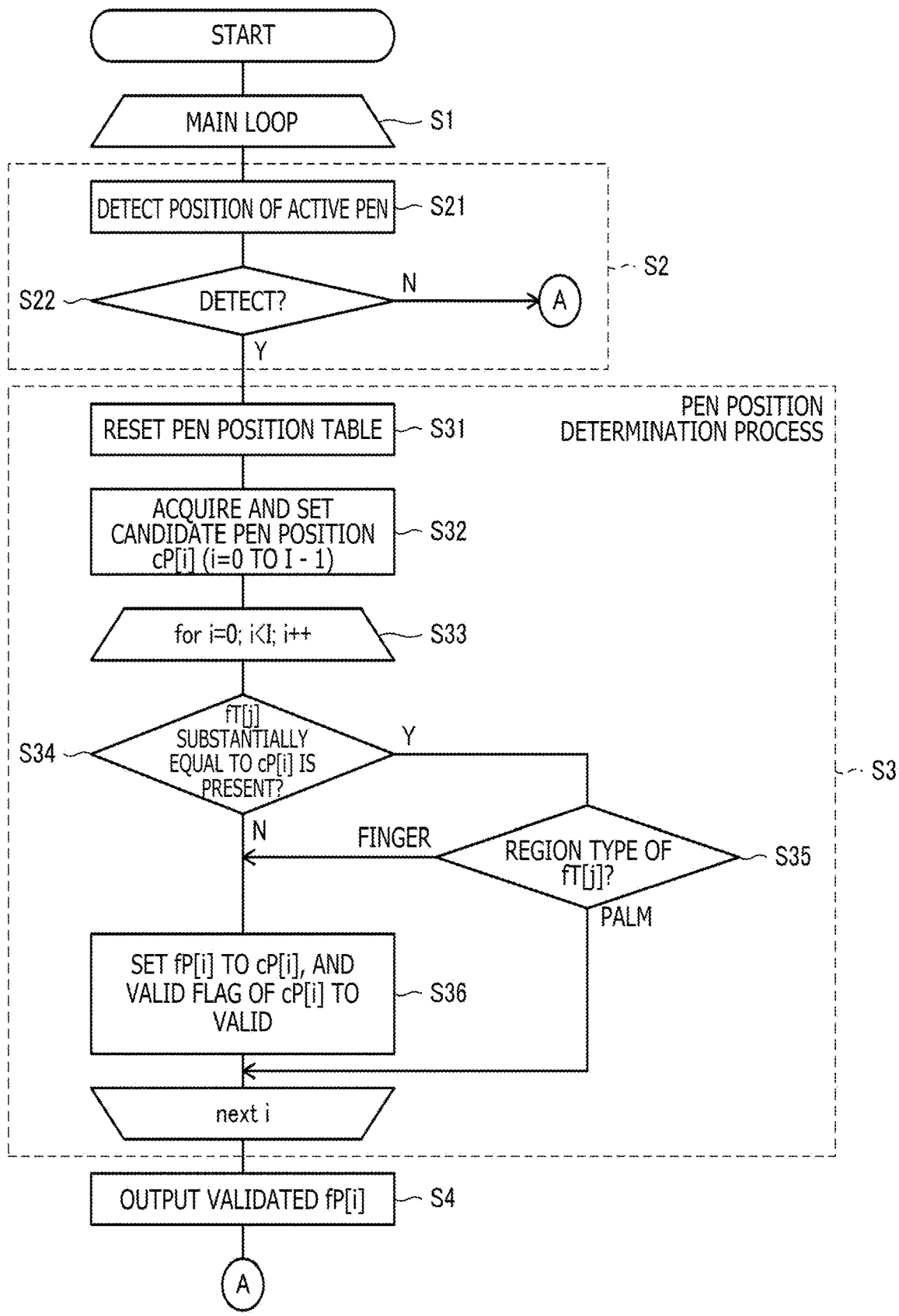
FIG. 9 is a flowchart depicting details of the flowchart depicted in FIG. 3.
Figure 10:
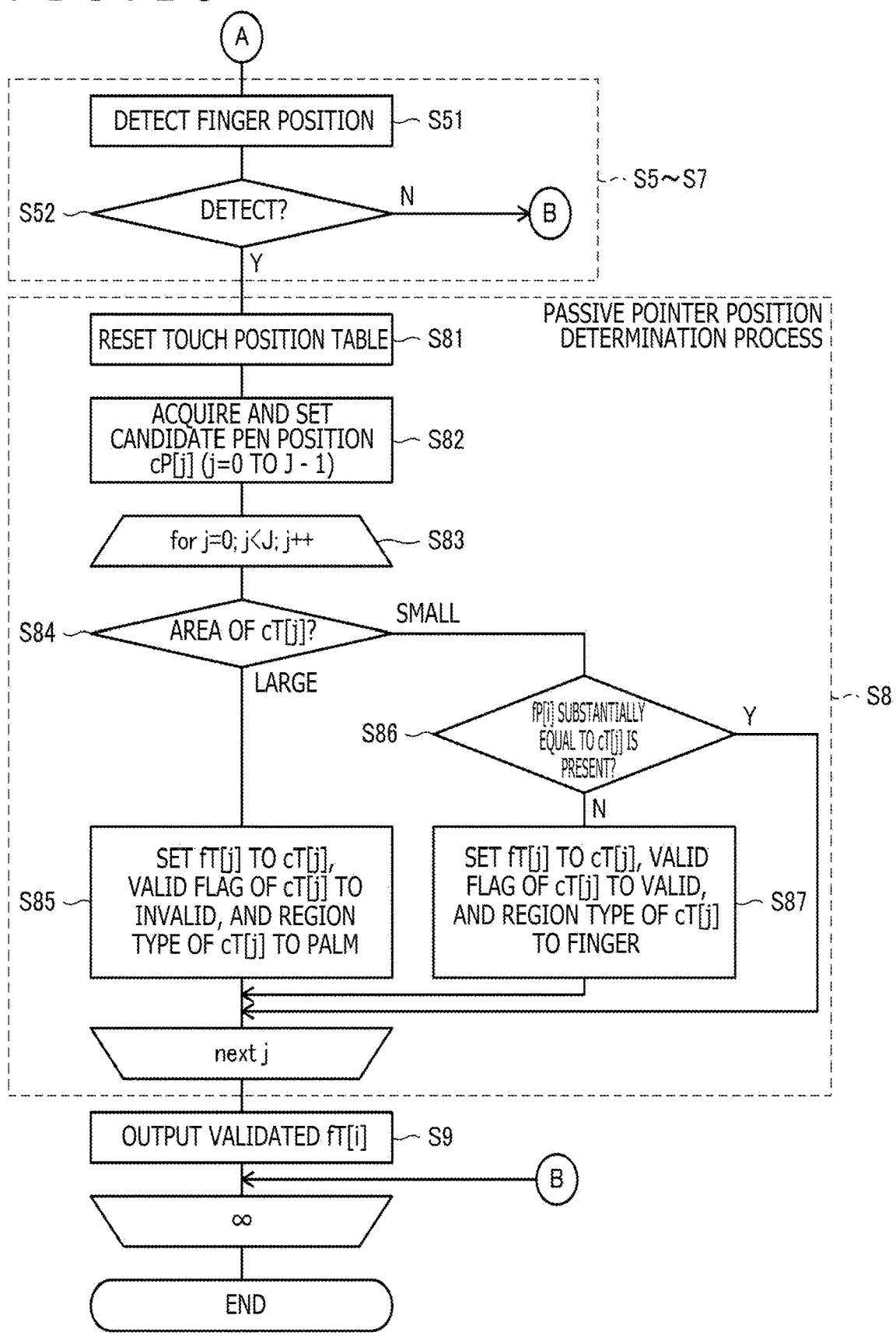
FIG. 10 is a flowchart depicting details of the flowchart depicted in FIG. 3.

Each of FIGS. 9 and 10 is a chart depicting details of the flowchart depicted in FIG. 3. Referring first to FIG. 9, the MCU 40 initially executes detection of the active pen 2 (S21), and determines whether or not the active pen 2 has been detected as a result of the detection (S22) to execute the processing at S2 depicted in FIG. 3. When it is determined that the active pen 2 has not been detected at S22, the process shifts to S51 in FIG. 10 to start the position detection process for the finger 4.

When it is determined that the active pen 2 has been detected at S22, the MCU 40 executes the pen position determination process depicted at S3 in FIG. 3. More specifically, the MCU 40 initially resets the pen position table (S31). After the reset, the pen position table comes into a state where no candidate pen position cP[i] is set. Subsequently, the MCU 40 acquires I (I: one or larger integer) candidate pen positions cP[i] (i: 0 to I−1) detected at S21, and adds the acquired candidate pen positions cP[i] to the pen position table (S32). Thereafter, the MCU 40 sequentially performs processing at S34 to S36 for all the candidate pen positions cP[i] (S33).

More specifically, the MCU 40 initially determines whether or not a decided touch position fT[j] equal to the candidate pen position cP[i] has been stored in the touch position table (S34). When it is determined that the decided touch position fT[j] equal to the candidate pen position cP[i] has been stored, it is determined which of "finger" and "palm" is the region type of this decided touch position stored in the touch position table (S35).

When it is determined that the decided touch position fT[j] equal to the candidate pen position cP[i] has not been stored at S34, and that it is determined that the region type is "finger" at S35, the MCU 40 sets the decided pen position fP[i] to the candidate pen position cP[i], and the corresponding valid flag to "valid" (S36). When it is determined that the region type is "palm" at S35, processing at S36 is not performed. As a result, the corresponding decided pen position fP[i] is set to NULL, while the corresponding valid flag is set to "invalid."

When the processing at S34 to S36 is completed for all the candidate pen positions cP[i], the MCU 40 outputs only the decided pen positon fP[i] for which the corresponding valid flag has been set to "valid" to the host processor 32 as the detected position of the active pen 2 (S4), and then starts the position detection process for the finger 4.

More specifically, as depicted in FIG. 10, the MCU 40 executes detection of the finger 4 (S51), and determines whether or not the finger 4 has been detected as a result of the detection (S52) to execute the processing at S5 to S7 depicted in FIG. 3. While the processing at S5 to S7 is executed herein, processing at S105 in FIG. 2 may be executed instead. In this case, however, the processing at S2 to S4 needs to be successively performed twice to obtain a sufficient detection rate of the active pen 2. When it is determined that the finger 4 has not been detected at S52, the process shifts to S21 in FIG. 9 to start the position detection process for the active pen 2.

When it is determined that the finger 4 has been detected at S52, the MCU 40 executes the passive pointer position determination process depicted at S8 in FIG. 3. More specifically, the MCU 40 initially resets the touch position table (S81). After the reset, the touch position table comes into a state where no candidate touch position cT[j] is set. Subsequently, the MCU 40 acquires J (J: one or larger integer) candidate touch positions cT[j] (j: 0 to J−1) detected at S51, and adds the acquired candidate touch positions cT[j] to the touch position table (S82). Thereafter, the MCU 40 sequentially performs processing at S84 to S87 for all the candidate pen positions cT[j] (S83).

More specifically, the MCU 40 initially calculates an area of the candidate touch position cT[j]. The area to be calculated herein is an area of a region including the candidate touch position cT[j], and exhibiting a predetermined change amount of capacitance or more. Then, the MCU 40 determines whether or not the calculated area is a predetermined size or larger (S84).

When it is determined that the area is the predetermined size or larger at S84 (i.e., area is determined to be large), the MCU 40 sets the decided touch position fT[j] to the candidate touch position cT[j], and the corresponding valid flag to "invalid," and the corresponding region type to "palm" (S85).

When it is determined that the area is not the predetermined size or larger at S84 (i.e., area is determined to be small), the MCU 40 subsequently determines whether or not a decided pen position fP[i] substantially equal to the candidate touch position cT[j] has been stored in the pen position table (S86). When it is determined the decided pen position fP[i] substantially equal to the candidate touch position cT[j] has not been stored, the MCU 40 sets the decided touch position fT[j] to the candidate touch position cT[j], the corresponding valid flag to "valid," and the corresponding region type to "finger" (S87). When it is determined that the decided pen position fP[i] substantially equal to the candidate touch position cT[j] has been stored at S86, the MCU 40 does not perform processing at S87. As a result, the corresponding decided touch position fT[j] is set to NULL, and the corresponding valid flag is set to "invalid."

When the processing at S15 to S18 is completed for all the candidate touch positions cT[j], the MCU 40 outputs only the decided touch positon fT[j] for which the corresponding valid flag has been set to "valid" to the host processor 32 as the detected position of the finger 4 (S9), and then returns to S2 to start the position detection process for the active pen 2.

More detailed description again concerning the output position determination process performed by the MCU 40 using the pen position table and the touch position table is now completed with reference to the process flow of the MCU 40. The output position determination process according to the present embodiment may be modified in various manners. Hereinafter described are first to fourth modified examples of the output position determination process according to the present embodiment.

The first modified example relates to the pen position determination process. The MCU 40 according to the present modified example is configured to output a position corresponding to the highest level of the downlink signal DS to the host processor 32 as the position of the active pen 2 when a plurality of positions corresponding to a predetermined level or higher of the downlink signal DS are detected. In case of the example depicted in FIG. 7, the level of the downlink signal DS at the candidate pen position cP[1] detected based on the downlink signal DS received via the hand 5 of the user is generally lower than the level of the downlink signal DS at the candidate pen position cP[0] detected based on the downlink signal DS directly received from the pen electrode of the active pen 2. Accordingly, the MCU 40 outputs the candidate pen position cP[0] to the host processor 32 as the position of the active pen 2. This result is similar to the corresponding result of the embodiment described above. It is therefore concluded that the MCU 40 of the present modified example can also correctly output the position of the active pen 2 to the host processor 32.

The second modified example also relates to the pen position determination process. The MCU 40 according to the present modified example is configured to detect the position of the active pen 2 based on an area of a region corresponding to the downlink signals DS each corresponding to a predetermined level or higher and successively located when a plurality of positions of the downlink signals DS having the predetermined level or higher and located away from each other are detected. More specifically, a position of a smaller area is detected as the position of the active pen 2. In case of the example depicted in FIG. 7, the area of the candidate pen position cP[1] detected based on the downlink signal DS received via the hand 5 of the user is larger than the area of the candidate pen position cP[0] detected based on the downlink signal DS received directly from the pen electrode of the active pen 2. Accordingly, the MCU 40 outputs the candidate pen position cP[0] to the host processor 32 as the position of the active pen 2. This result is also similar to the result of the embodiment described above. It is therefore concluded that the MCU 40 of the present modified example can also correctly output the position of the active pen 2 to the host processor 32.

The third modified example relates to the passive pointer position determination process. The MCU 40 of the present modified example is configured to change a predetermined size corresponding to a reference for determination at S15 depicted in FIG. 10 (palm determination) in accordance with whether or not the position of the active pen 2 has been detected by the position detection process for the active pen 2 performed immediately before. More specifically, the MCU 40 is configured to reduce the predetermined size when one or more pen positions are output in the pen detection process (see FIG. 3) performed immediately before. For example, the predetermined size is set to 20 mm when the position of the active pen 2 is not detected in the position determination process for the active pen 2 performed immediately before, while the predetermined size is set to 16 mm when one or more positions of the active pen 2 are detected in the position determination process for the active pen 2 performed immediately before. This changing process is performed to more rapidly distinguish between the active pen 2 and the hand 5 in the state that the active pen 2 has been detected. More specifically, a certain short period is required to bring the hand 5 into contact with the touch surface 3a, wherefore a small contact area may be produced between the hand 5 and the touch surface 3a at a certain time during this period. Accordingly, misrecognition of the contact position of the hand 5 as the contact position of the finger 4 may be caused at the time of determination of the palm or the finger based on determination of the area during the position detection process for the finger 4. According to the present modified example, however, the possibility of the misrecognition can decrease by reduction of the predetermined size as described above in the state that the active pen 2 has been detected.

According to the position detection process for the active pen 2 described above, the position of the active pen 2 is detectable even in a state of non-contact between the active pen 2 and the touch surface 3a (hover state). More specifically, the position of the active pen 2 even in the hover state is detectable based on the downlink signal DS detected by the MCU 40 when the active pen 2 approaches the touch surface 3a to a certain degree or more from the touch surface 3a. According to the third modified example, the predetermined size can be reduced during the hover state of the active pen 2 approaching the touch surface 3a, wherefore the active pen 2 comes into contact with the touch surface 3a with a reduced possibility of the foregoing misrecognition.

Figure 11:
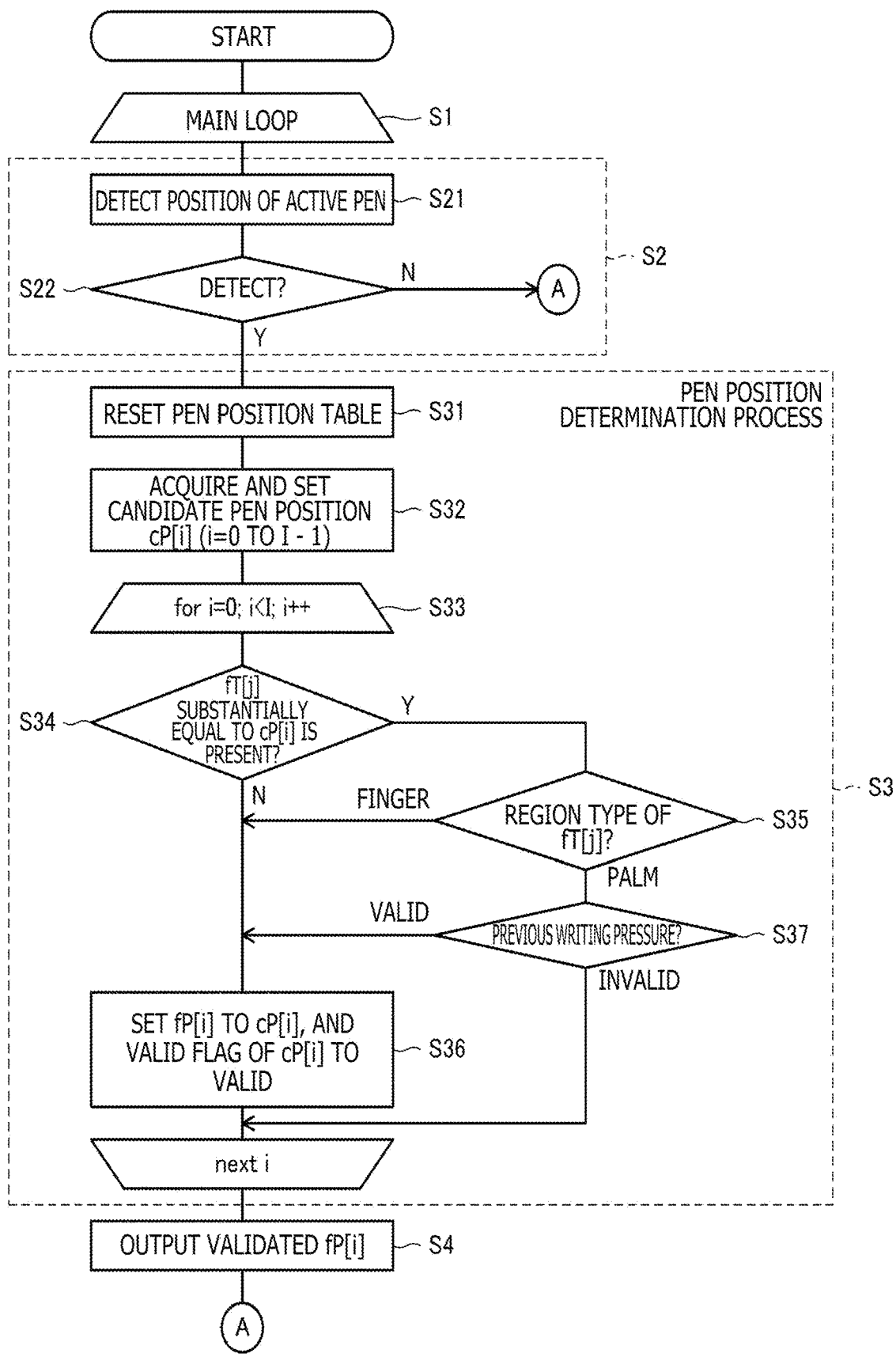
FIG. 11 is a flowchart depicting a pointer position detection process executed by the sensor controller according to a fourth modified example of an embodiment of the present disclosure.

FIG. 11 is a flowchart depicting the pointer position detection process performed by the controller 31 according to the fourth modified example. This figure depicts a modified example of the flowchart depicted in FIG. 9.

The flowchart of FIG. 11 is different from the flowchart of FIG. 9 in that step S37 is executed after determination as "palm" at S35. More specifically, the MCU 40 of the present modified example determines whether or not the pen position currently detected at S35 (more specifically, candidate pen position cP[i]) is present near the palm region (i.e., which of "finger" and "palm" is the region type stored in the touch position table and associated with the decided touch position fT[j] substantially equal to the candidate pen position cP[i]). When it is determined that the current pen position is present near the palm region (i.e., region type is determined to be "palm"), it is determined which of valid (writing pressure >0) and invalid (printing pressure=0) is selected as a writing pressure (writing pressure previously detected) indicated by printing pressure data included in the data Res output in the previous pen detection process (S37). When it is determined that the printing pressure is valid, the process shifts to S36 to set the decided pen position fP[i] to the candidate pen position cP[i], and set the corresponding valid flag to "valid" (S36). When it is determined that the writing pressure is invalid, processing at S36 is not performed. In this case, the corresponding decided pen position fP[i] is set to NULL, while the corresponding valid flag is set to "invalid."

According to the fourth modified example, disappearance of a drawing line near the palm region can be prevented during input operation by the user using the active pen 2. More specifically, according to the process flow of FIG. 9, determination as "palm" is made at S35 when the pen tip approaches the palm area during input operation by the user using the active pen. In this case, the decided pen position fP[i] is not set to the candidate pen position cP[i]. As a result, coordinates are not output to the host processor 32, wherefore a drawing line is broken. It is preferable, however, that no break of the drawing line is produced during continuous input operation by the user even when the pen tip approaches the palm region. According to the fourth modified example, it is determined at S37 whether the writing pressure previously detected is valid or invalid, wherefore whether or not the user continuously performs input operation can be determined. Accordingly, coordinate output to the host processor 32 is allowed to continue during continuous input operation by the user, wherefore disappearance of a drawing line near the palm region is avoidable during input operation by the user using the active pen 2.

Described hereinafter in detail is the 1/N process. In the following description, problems arising from the related art concerning the 1/N process, and advantageous effects produced by introduction of the 1/N process are again described in more detail, and then contents of the 1/N process are described in detail.

Figure 12A:
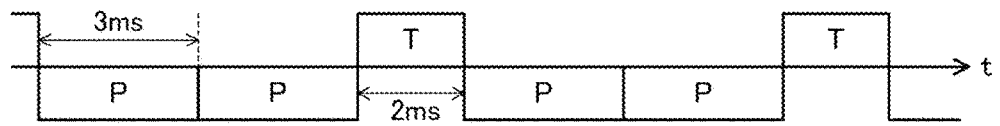
Figure 12B:
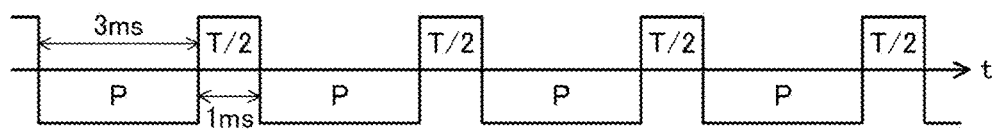
FIG. 12B is a chart depicting a control sequence of the pointer position detection process according to an embodiment of the present disclosure.

FIG. 12A is a chart depicting a control sequence of a pointer position detection process according to the related art of the present disclosure, while FIG. 12B is a chart depicting a control sequence of a pointer position detection process according to the present embodiment. In these charts, "T" indicates a period in which the MCU 40 performs the position detection process for the finger 4, while "P" indicates a period in which the MCU 40 performs the position detection process for the active pen 2.

As depicted in FIG. 12A, the MCU 40 according to the related art of the present disclosure performs the position detection process for the active pen 2 successively twice. This process requires 3 milliseconds per one process. The MCU 40 subsequently performs the position detection process for the finger 4 once. This process requires 2 milliseconds per one process. The MCU 40 is configured to repeat the position detection process for the finger 4 and the active pen 2 in this pattern. The detection rate of the finger 4 in this case is 125 (=⅛×1000) times/sec, while the detection rate of the active pen 2 in this case is 250 (=²⁄₈×1000) times/sec. In this case, the detection rate of the active pen 2 improves. According to this position detection process, however, detection intervals of the active pen 2 are not regular intervals, wherefore an unnatural drawing result is produced in a drawing application which operates based on an expectation that coordinate data indicating the active pen 2 and sequentially output from the sensor controller 31 is transmitted at regular intervals in view of time, for example.

However, the MCU 40 of the present embodiment executes the 1/N process of the position detection process (first detection process) for the finger 4 (first pointer) at a rate of 250 (=¼×1000) (first detection rate) as depicted in FIG. 12B. In FIG. 12B, N is set to 2, in which case a time required for executing the 1/N process is ½ of the time required for executing the position detection process for the finger 4 according to the example depicted in FIG. 12A, i.e., 1 millisecond. Thereafter, the MCU 40 acquires partial detection data indicating whether or not the finger 4 is present based on the 1/N process, and retains the partial detection data in the shift register 40a depicted in FIG. 5 (first detection step up to this processing). The shift register 40a is configured to store N partial detection data, and delete partial detection data acquired N times before at the time of writing new partial detection data to the shift register 40*a*.

The MCU 40 further combines (N−1) partial detection data already retained in the memory and partial detection data newly retained every time new partial detection data is retained in the memory to generate entire detection data indicating whether or not the finger 4 is present for the entire touch surface 3*a* (combining). The generated entire detection data is subjected to the correlation value calculation process (correlation value calculation step) described with reference to FIG. 5, and output from the MCU 40 to the host processor 32 at the first detection rate (250 times/sec) as the passive pointer position (reporting).

The 1/N process is executed at predetermined intervals (more specifically, intervals of 3 milliseconds). The entire position detection process (second detection process) for the active pen 2 (second pointer) is executed only once at each interval (second detection). Accordingly, the detection rate of the position of the active pen 2 (second detection rate) is equal to the first detection rate (250 times/sec) described above. Even in the state that detection of the active pen 2 is executed at regular intervals, the detection rate of the active pen 2 in this case is equalized with the detection rate of the active pen 2 of the example depicted in FIG. 12A.

According to the pointer position detection process of the present embodiment, the position detection process for the finger 4 is divided into N partial processes. In this case, detection of the active pen 2 can be executed at regular intervals while maintaining the detection rates of both the active pen 2 and the finger 4. Accordingly, the problems described above are not produced. The contents of the 1/N process are hereinafter described in detail.

Described hereinafter are first to fifth examples of the contents of the 1/N process. The 1/N process in each of the first to fourth examples detects 1/N of the entire touch surface 3*a* (i.e., detects changes of capacitances at intersections of sensor electrodes 30X and sensor electrodes 30Y), and uses substantially 1/N of the plurality of sensor electrodes 30X (first electrodes) (see FIGS. 14A and 14B and 16A and 16B referred to below), for example, or substantially 1/N of the plurality of sensor electrodes 30Y (second electrodes) (see FIGS. 15A and 15B and 17A and 17B referred to below), for example. In this case, substantially 1/N is the number of the sensor electrodes 30X or the sensor electrodes 30Y adjusted to an integer when 1/N is not an integer in each process. On the other hand, the 1/N process in the fifth example uses 1/N part of the finger detection signal FDS (more specifically, M of N×M (M=K/N) pulses constituting each of the signals $s_1$ to $S_k$ described above) (see FIGS. 18A and 18B referred to below). Each of the examples is hereinafter detailed. Described herein is an example of N=2 and use of the 16×16 sensor 30. However, the same description is applicable to the case of N≥3 or the sensor 30 of a size other than 16×16.

Figure 13:
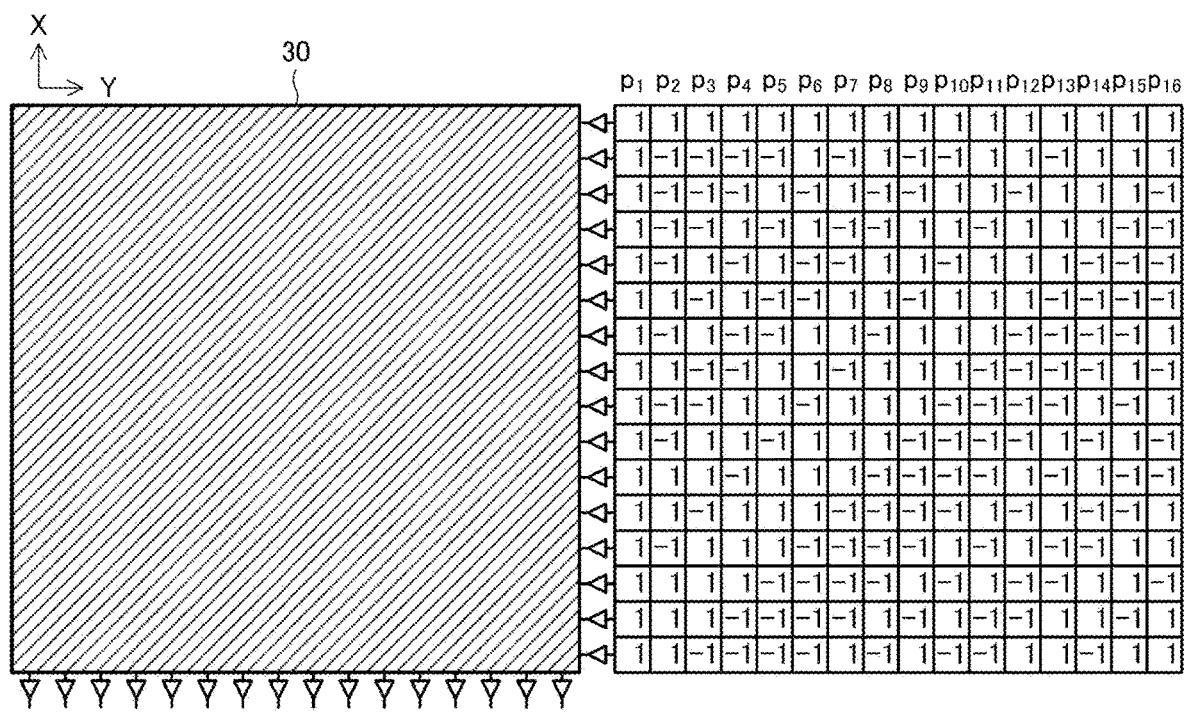
FIG. 13 is a diagram depicting an example of a finger detection signal FDS used together with a 16×16 sensor.

Initially, FIG. 13 is a diagram depicting an example of the finger detection signal FDS used together with the 16×16 sensor 30. As depicted in this figure, the finger detection signal FDS in this case is constituted by 16 pulse groups $p_1$ to $p_{16}$. Each of the pulse groups $p_1$ to $p_{16}$ includes 16 pulses expressed as "1" or "−1."

As described above, the MCU 40 and the logic circuit 41 are configured to repeatedly perform, for the respective sensor electrodes 30Y, the operation for selecting the one sensor electrode 30Y, and causing the transmission circuit 42 to sequentially input the respective pulse groups $p_n$ (n=1 to 16) to the respective sensor electrodes 30X. Accordingly, assuming that a time required for processing the one pulse group $p_n$ is t, a time required for performing the position detection process for the finger 4 (in this example, position detection process executed at S105 depicted in FIG. 2) is t×16 (=total number of pulse groups $p_n$)×16 (=total number of sensor electrodes 30Y).

Figure 14A:
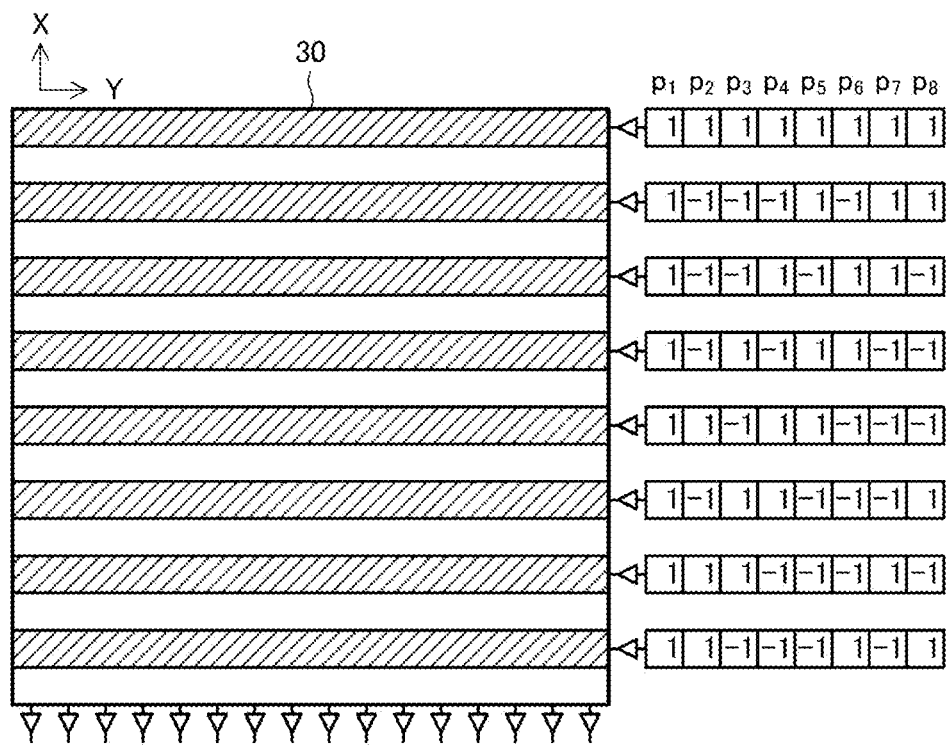
FIGS. 14A and 14B are diagrams depicting a first example of contents of a 1/N process according to ab embodiment of the present disclosure.
Figure 14B:
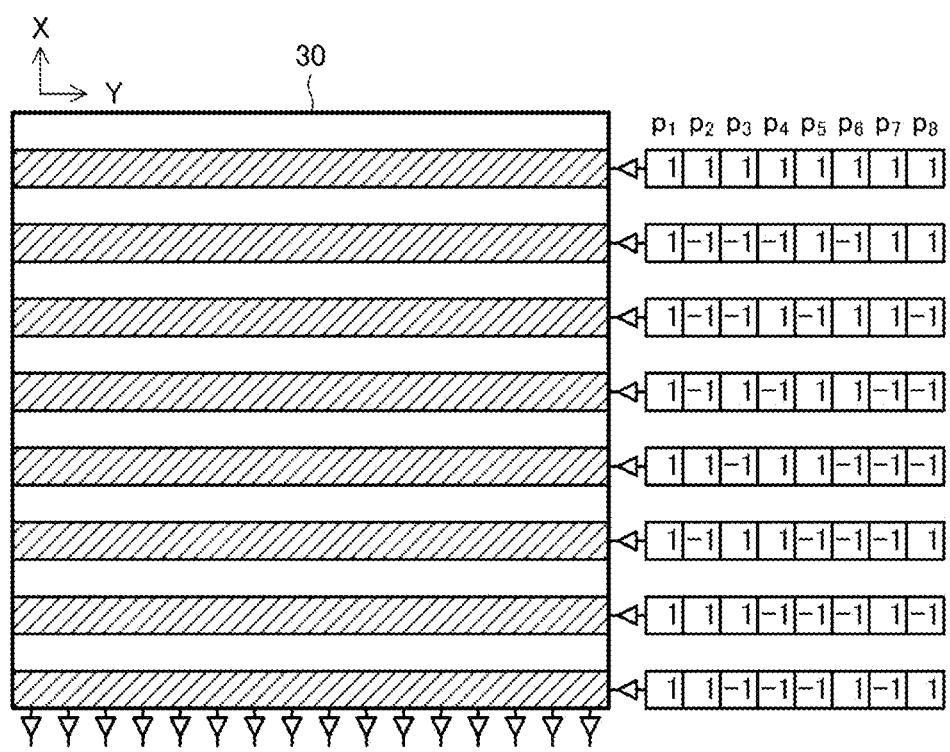

FIGS. 14A and 14B are diagrams depicting the first example of the contents of the 1/N process. FIG. 14A depicts a first process, while FIG. 14B depicts a second process. This example performs the 1/N process using the eight sensor electrodes 30X different from each other in each of the first process and the second process. More specifically, every other sensor is selected from the 16 sensor electrodes 30X arranged in the X direction, and used for the first process, while the remaining sensor electrodes 30X are used for the second process.

According to the first example, the number of the sensor electrodes 30X to which the finger detection signal FDS is input in one process is eight, wherefore the finger detection signal FDS can be constituted by only the eight pulse groups $p_1$ to $p_8$. Accordingly, the time required for performing one process is t×8 (=total number of pulse groups $p_n$)×16 (=total number of sensor electrodes 30Y), wherefore one process can be completed in ½ of the time required for the position detection process of the example depicted in FIG. 2 or FIG. 12A.

Moreover, according to the first example, all the sensor electrodes 30X are covered by the first and second processes. Accordingly, the MCU 40 can generate entire detection data indicating whether or not the finger 4 is present for the entire touch surface 3*a* by combining partial detection data retained in the shift register 40*a* (see FIG. 5) as a result of the first process, and partial detection data retained in the shift register 40*a* as a result of the second process.

Furthermore, according to the first example, the order of the first process and the second process is not particularly limited. Accordingly, at the time of acquisition of new partial detection data, the MCU 40 can generate entire detection data by combining the new partial detection data with (N−1) partial detection data already stored in the shift register 40*a* every time the 1/N process is performed. More specifically, entire detection data can be generated not only by combining the partial detection data retained in the shift register 40*a* as a result of the first process and the partial detection data retained in the shift register 40*a* as a result of the second process executed immediately after the first process, but also by combining the partial detection data retained in the shift register 40*a* as a result of the second process and the partial detection data retained in the shift register 40*a* as a result of the first process executed immediately after the second process. Accordingly, the detection result of the finger 4 can be output at a twice higher detection rate than the detection rate of the finger 4 of the example depicted in FIG. 2 or FIG. 12A.

Figure 15A:
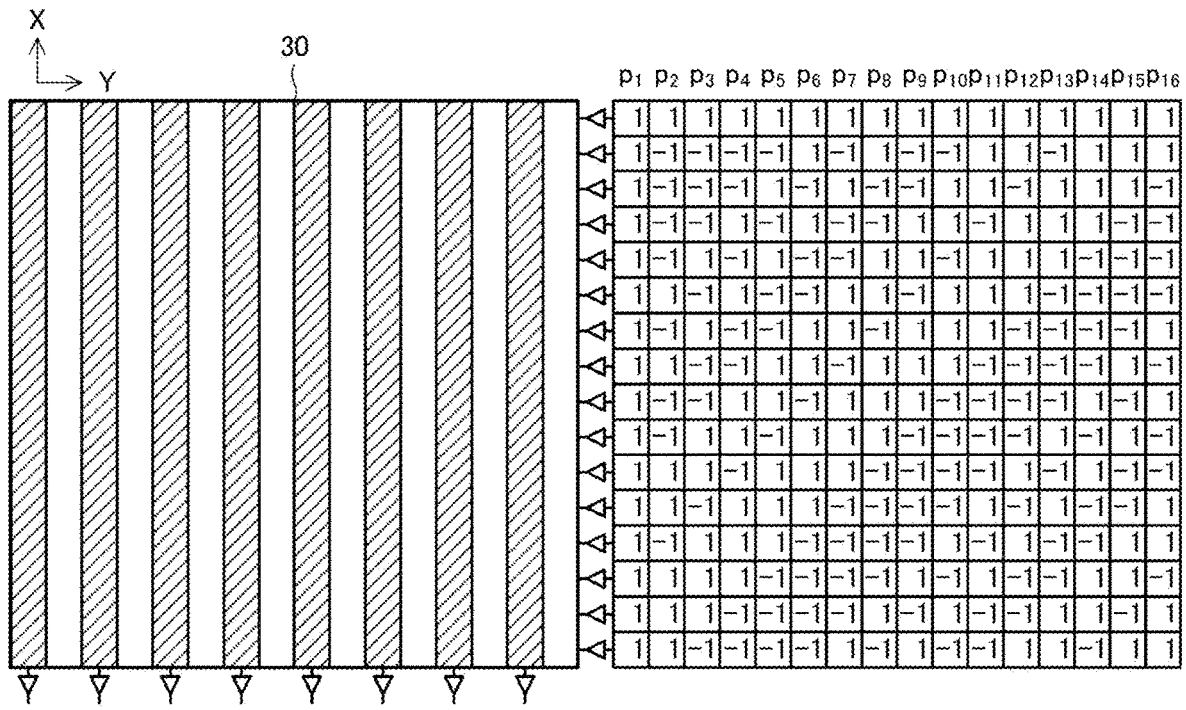
FIGS. 15A and 15B are diagrams depicting a second example of the contents of the 1/N process according to an embodiment of the present disclosure.
Figure 15B:
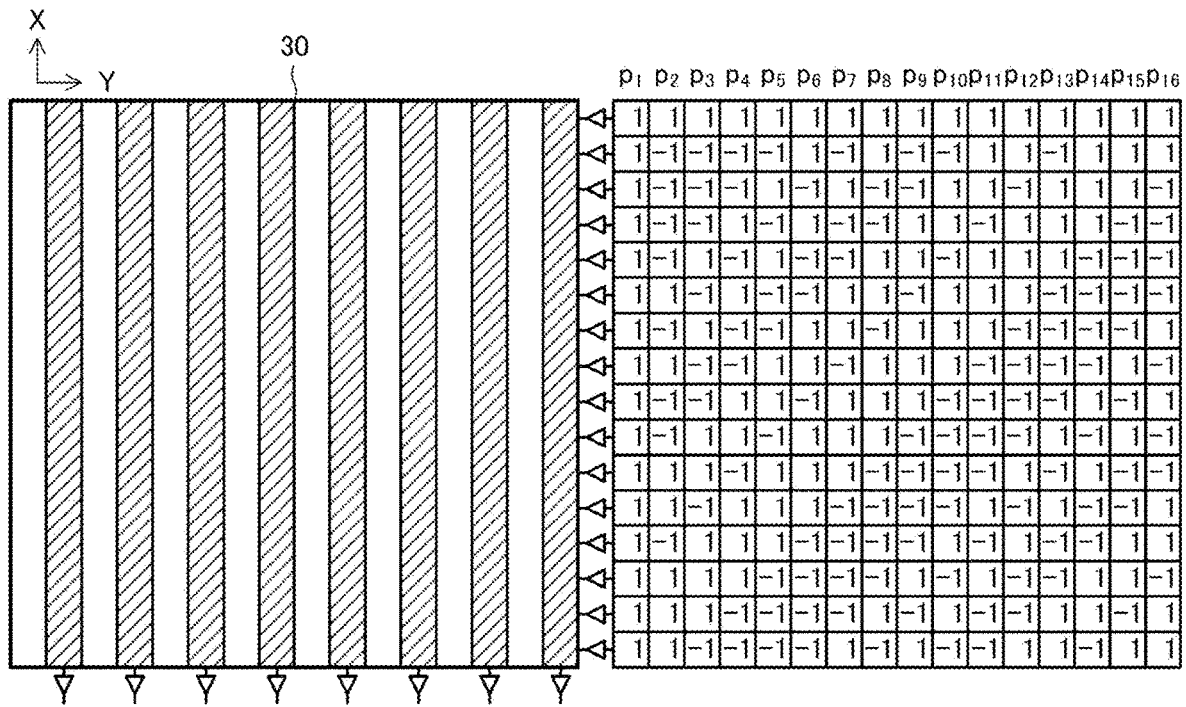

FIGS. 15A and 15B are diagrams depicting the second example of the contents of the 1/N process. FIG. 15A depicts a first process, while FIG. 15B depicts a second process. This example performs the 1/N process using the eight sensor electrodes 30Y different from each other in each of the first process and the second process. More specifically, every other sensor is selected from the 16 sensor electrodes 30Y arranged in the Y direction, and used for the first process, while the remaining sensor electrodes 30Y are used for the second process.

According to the second example, the number of the sensor electrodes 30Y selected in one process is eight. Accordingly, the time required for performing one process is t×16 (=total number of pulse groups $p_n$)×8 (=total number of sensor electrodes 30Y), wherefore one process can be completed in ½ of the time required for the position detection process of the example depicted in FIG. 2 or FIG. 12A.

Moreover, according to the second example, all the sensor electrodes 30Y are covered by the first and second processes similarly to the above example. Accordingly, similarly to the first example, the MCU 40 can generate entire detection data indicating whether or not the finger 4 is present for the entire touch surface 3a by combining partial detection data retained in the shift register 40a as a result of the first process, and partial detection data retained in the shift register 40a as a result of the second process.

Furthermore, according to the second example, the order of the first process and the second process is not particularly limited similarly to the above example. Accordingly, the detection result of the finger 4 can be output at a twice higher detection rate than the detection rate of the finger 4 of the example depicted in FIG. 2 or FIG. 12A similarly to the first example.

Figure 16A:
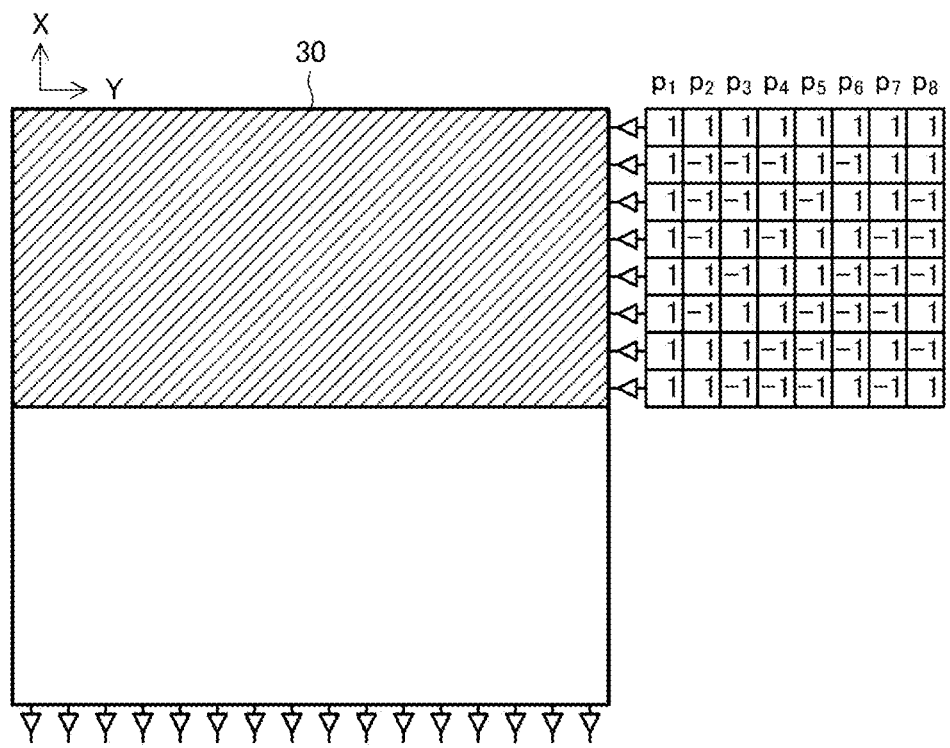
FIGS. 16A and 16B are diagrams depicting a third example of the contents of the 1/N process according to an embodiment of the present disclosure.
Figure 16B:
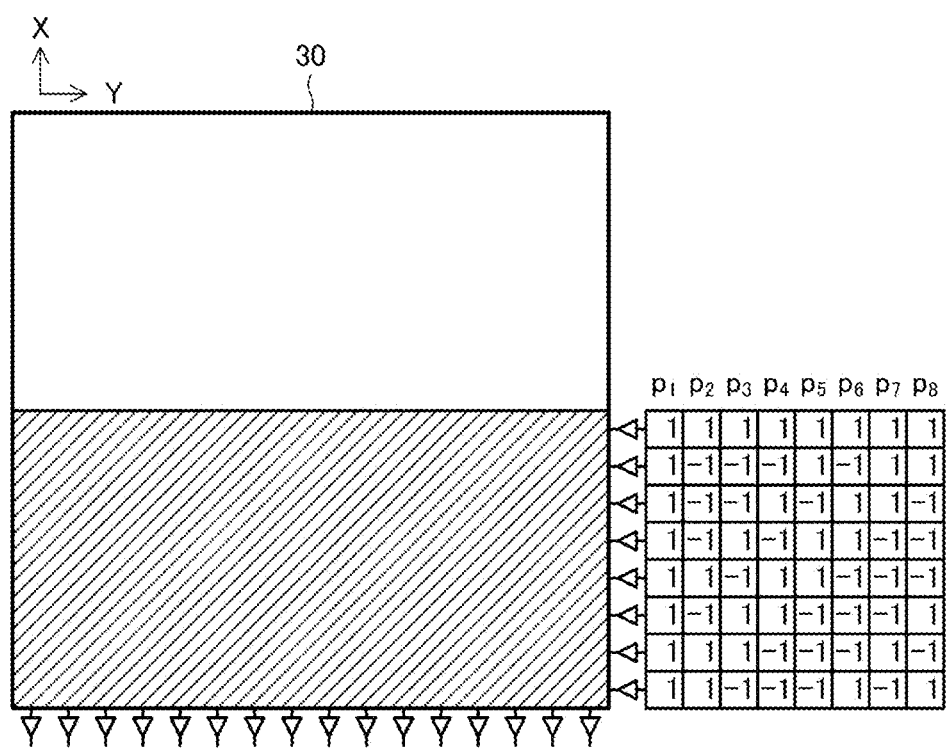

FIGS. 16A and 16B are diagrams depicting the third example of the contents of the 1/N process. FIG. 16A depicts a first process, while FIG. 16B depicts a second process. This example performs the 1/N process using the eight sensor electrodes 30X different from each other in each of the first process and the second process similarly to the first example. However, in the present example, eight sensors are sequentially selected from one end of the arranged 16 sensor electrodes 30X, and used for the first process, while the remaining sensor electrodes 30X are used for the second process.

According to the third example, one process can be completed in ½ of the time required for the position detection process of the example depicted in FIG. 2 or FIG. 12A for a reason similar to the reason of the first example. Moreover, entire detection data indicating whether or not the finger 4 is present can be generated for the entire touch surface 3a. Furthermore, a detection result of the finger 4 can be output at a twice higher detection rate than the detection rate of the finger 4 of the example depicted in FIG. 2 or FIG. 12A.

Figure 17A:
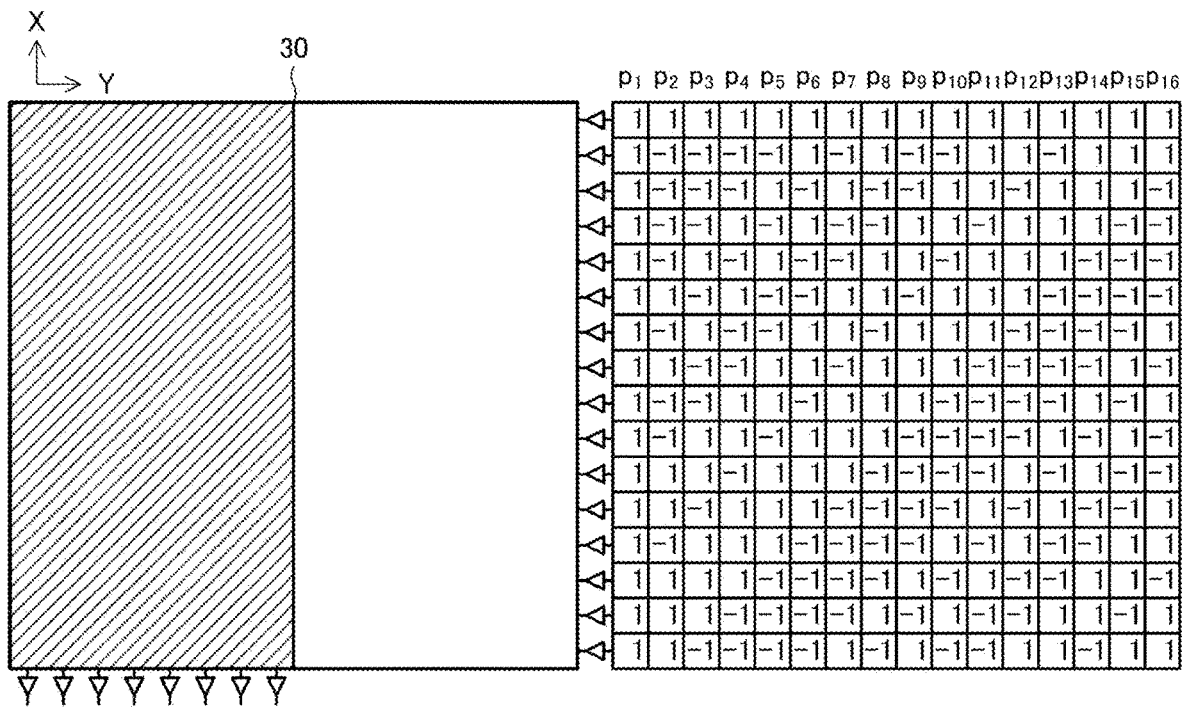
FIGS. 17A and 17B are diagrams depicting a fourth example of the contents of the 1/N process according to an embodiment of the present disclosure.
Figure 17B:
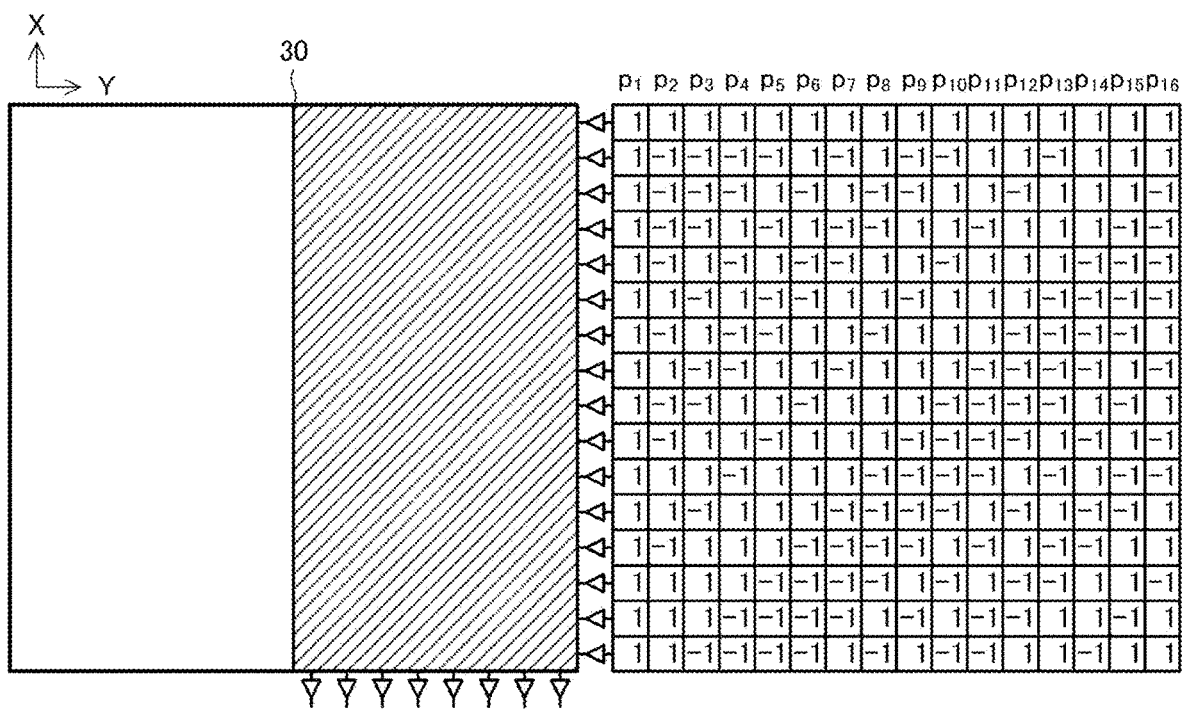

FIGS. 17A and 17B are diagrams depicting the fourth example of the contents of the 1/N process. FIG. 17A depicts a first process, while FIG. 17B depicts a second process. This example performs the 1/N process using the eight sensor electrodes 30Y different from each other in each of the first process and the second process similarly to the second example. However, in the present example, eight sensors are sequentially selected from one end of the arranged 16 sensor electrodes 30Y, and used for the first process, while the remaining sensor electrodes 30Y are used for the second process.

According to the fourth example, one process can be completed in ½ of the time required for the position detection process of the example depicted in FIG. 2 or FIG. 12A for a reason similar to the reason of the second example. Moreover, entire detection data indicating whether or not the finger 4 is present can be generated for the entire touch surface 3a. Furthermore, a detection result of the finger 4 can be output at a twice higher detection rate than the detection rate of the finger 4 of the example depicted in FIG. 2 or FIG. 12A.

Figure 18A:
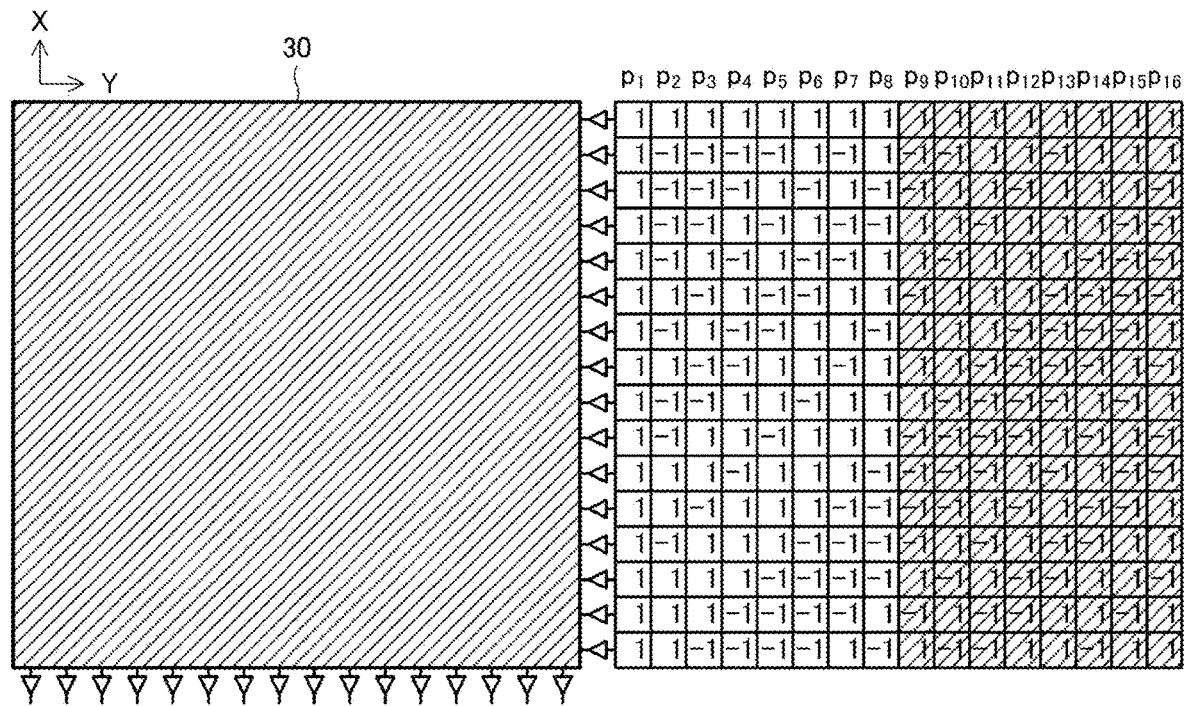
FIGS. 18A and 18B are diagrams depicting a fifth example of the contents of the 1/N process according to an embodiment of the present disclosure.
Figure 18B:
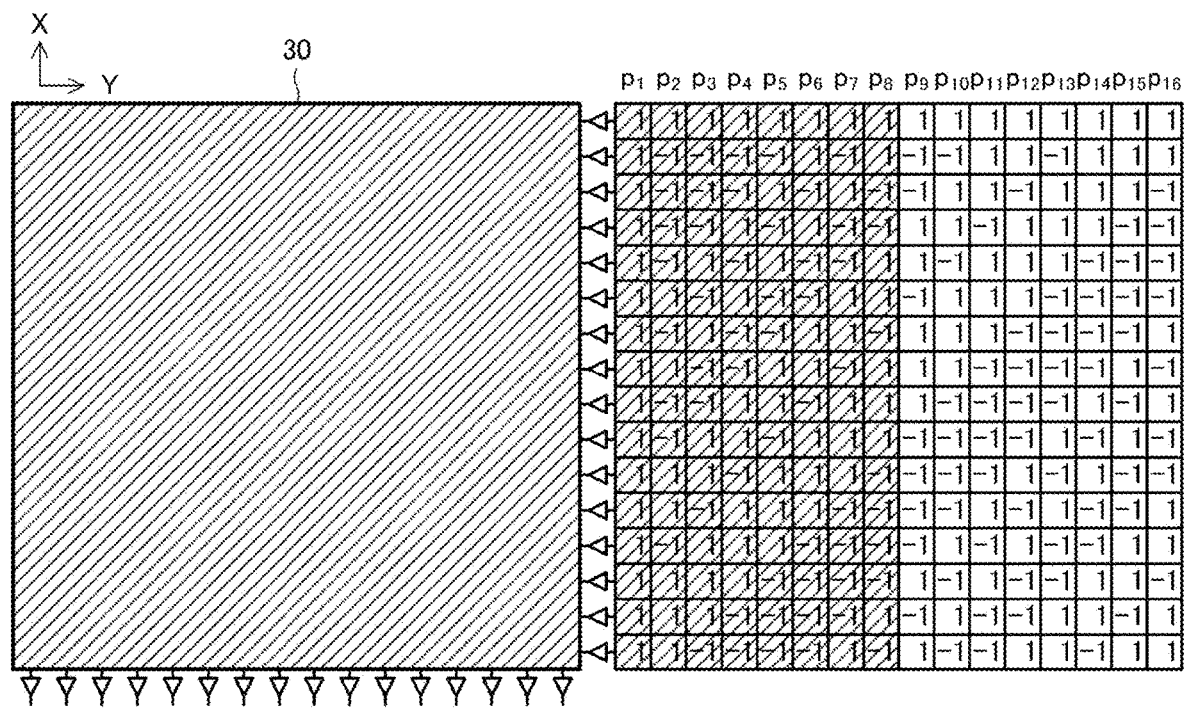

FIGS. 18A and 18B are diagrams depicting the fifth example of the contents of the 1/N process. FIG. 18A depicts a first process, while FIG. 18B depicts a second process. In this example, only the half of the 16 pulse groups $p_1$ to $p_{16}$ are used in the first process, while the remaining pulse groups are used in the second process. More specifically, the pulse groups $p_1$ to $p_8$ are used in the first process, while the pulse groups $p_9$ to $p_{16}$ are used in the second process.

According to the fifth example, only the eight pulses are input to each of the sensor electrodes 30X in one process. In this case, the time required for performing one process is t×8 (=total number of pulse groups $p_n$)×16 (=total number of sensor electrodes 30Y), wherefore one detection operation can be completed in ½ of the time of the position detection process of the example depicted in FIG. 2 or FIG. 12A.

Moreover, according to the fifth example, all the 16 pulse groups $p_1$ to $p_{16}$ are covered by the first and second processes. Accordingly, similarly to the first to fourth examples, the MCU 40 can generate entire detection data indicating whether or not the finger 4 is present for the entire touch surface 3a by combining partial detection data retained in the shift register 40a as a result of the first process, and partial detection data retained in the shift register 40a as a result of the second process.

Furthermore, the order of the first process and the second process is not particularly limited in the fifth example similarly to the above examples. Accordingly, the detection result of the finger 4 can be output at a twice higher detection rate than the detection rate of the finger 4 of the example depicted in FIG. 2 or FIG. 12A.

Figure 19:
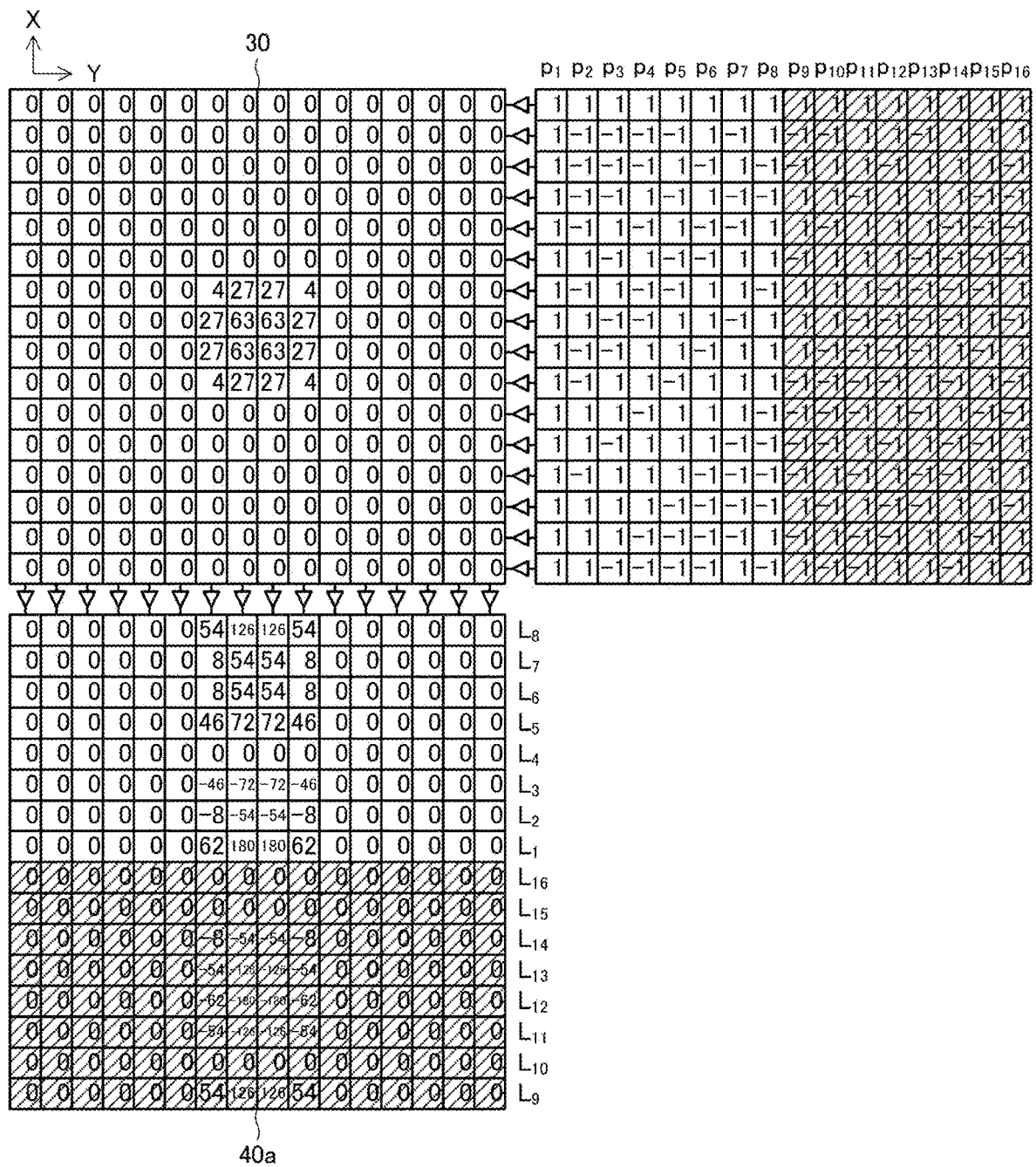
FIG. 19 is a diagram depicting an example of specific storage contents of a shift register according to the fifth example.
Figure 20:
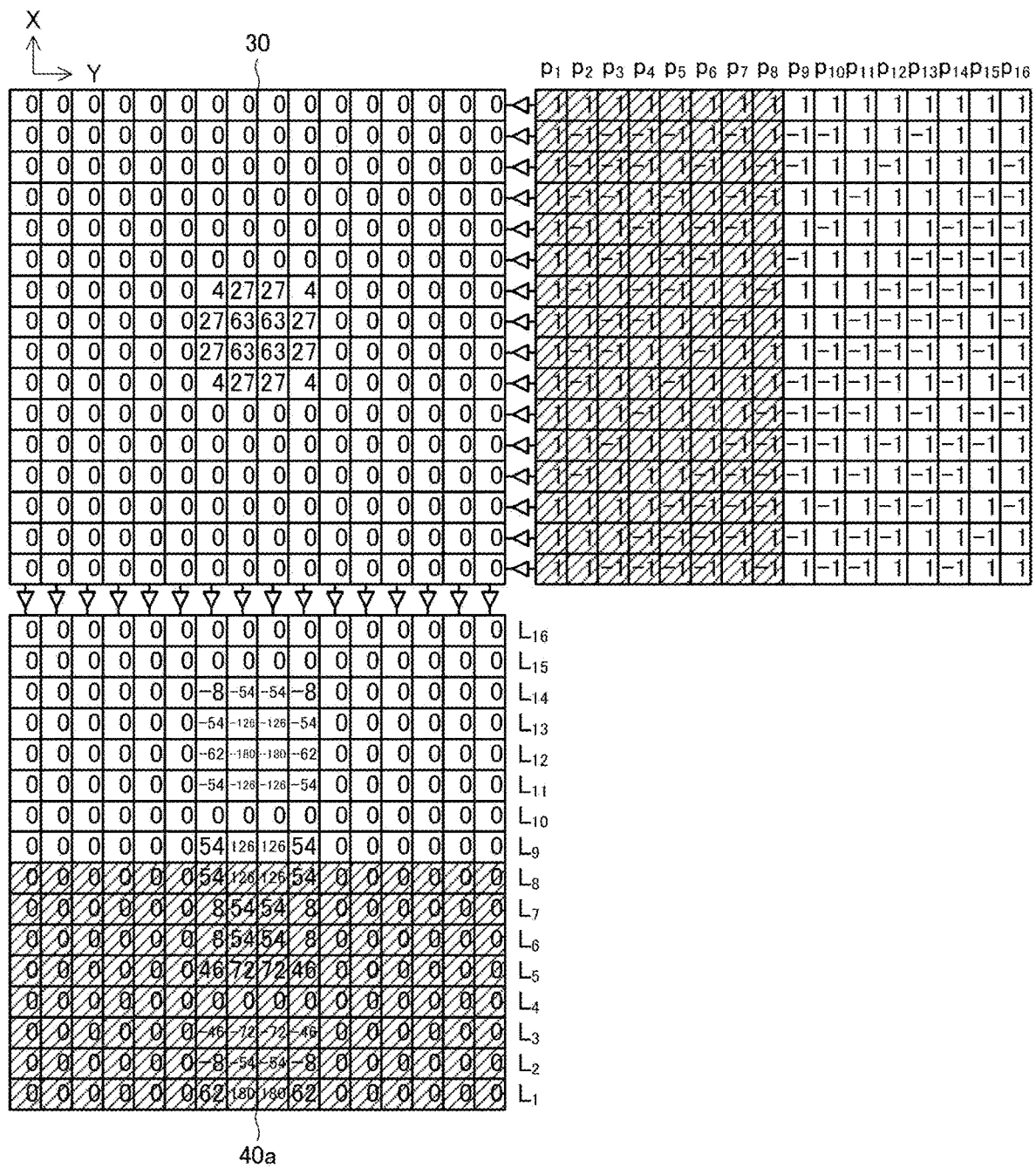
FIG. 20 is a diagram depicting another example of the specific storage contents of the shift register according to the fifth example.

FIGS. 19 and 20 are diagrams each depicting an example of specific storage contents of the shift register 40a (see FIG. 5) in the fifth example. These figures each indicate the storage contents of the shift register 40a arranged in correspondence with the respective sensor electrodes 30Y for easy understanding. Numerical values depicted in the sensor 30 in these figures indicate capacitances at the respective intersections of the sensor electrodes 30X and 30Y. A method for generating the entire detection data in the fifth example is hereinafter specifically described with reference to FIGS. 19 and 20.

FIG. 19 depicts storage contents of the shift register 40a immediately after completion of the first process. In the first process, the levels $L_1$ to $L_8$ are stored in the shift register 40a for each of the sensor electrodes 30Y. At the time of completion of the first process for one of the sensor electrodes 30Y, there remain the levels $L_9$ to $L_{16}$ stored in the shift register 40a by the second process performed immediately before the first process for the corresponding sensor electrode 30Y as depicted in FIG. 19. Accordingly, the MCU 40 combines partial detection data expressed by the levels $L_1$ to $L_8$ newly stored, and partial detection data expressed by the levels $L_9$ to $L_{16}$ remaining in the shift register 40a into one entire detection data, and calculates the correlation values described above using the entire detection data. In this manner, the MCU 40 can output coordinates indicating the position of the finger 4 to the host processor 32 at the time of completion of the first detection operation.

FIG. 20 depicts storage contents of the shift register 40a immediately after completion of the second process. In the second process, the levels $L_9$ to $L_{16}$ are stored in the shift register 40a for each of the sensor electrodes 30Y. At the time of completion of the second process for one of the sensor electrodes 30Y, there remain the levels $L_1$ to $L_8$ stored in the shift register 40a by the first process performed immediately before the second process for the corresponding sensor electrode 30Y as depicted in FIG. 20. Accordingly, the MCU 40 combines partial detection data expressed by the levels $L_9$ to $L_{16}$ newly stored, and partial detection data expressed by the levels $L_1$ to $L_8$ remaining in the shift register 40a into one entire detection data, and calculates the correlation values described above using the entire detection data. In this manner, the MCU 40 can output coordinates indicating the position of the finger 4 to the host processor 32 also at the time of completion of the second detection operation.

As described above, the pointer position detection process according to the present embodiment executes the position detection process for the finger 4 after dividing the process into N parts. Accordingly, detection of the active pen 2 is achievable at regular intervals while maintaining sufficient detection rates of both the active pen 2 and the finger 4. Accordingly, this detection process overcomes the problem of the unnatural drawing result produced in the drawing application which operates based on the expectation that coordinate data indicating the active pen 2 and sequentially output from the sensor controller 31 is transmitted at regular intervals in view of time, for example. Moreover, according to the position detection process of the present embodiment, the finger 4 is detectable at a higher detection rate than that of the related art.

The position detection system 1 according to a second embodiment of the present disclosure is hereinafter described. The position detection system 1 according to the present embodiment has a function of preventing formation of an unnecessary line caused by presence of a ghost position described above, as well as the functions of the position detection system 1 of the first embodiment. Configurations identical to the corresponding configurations of the first embodiment are given identical reference numbers, and differences from the first embodiment are hereinafter chiefly described.

Figure 22:
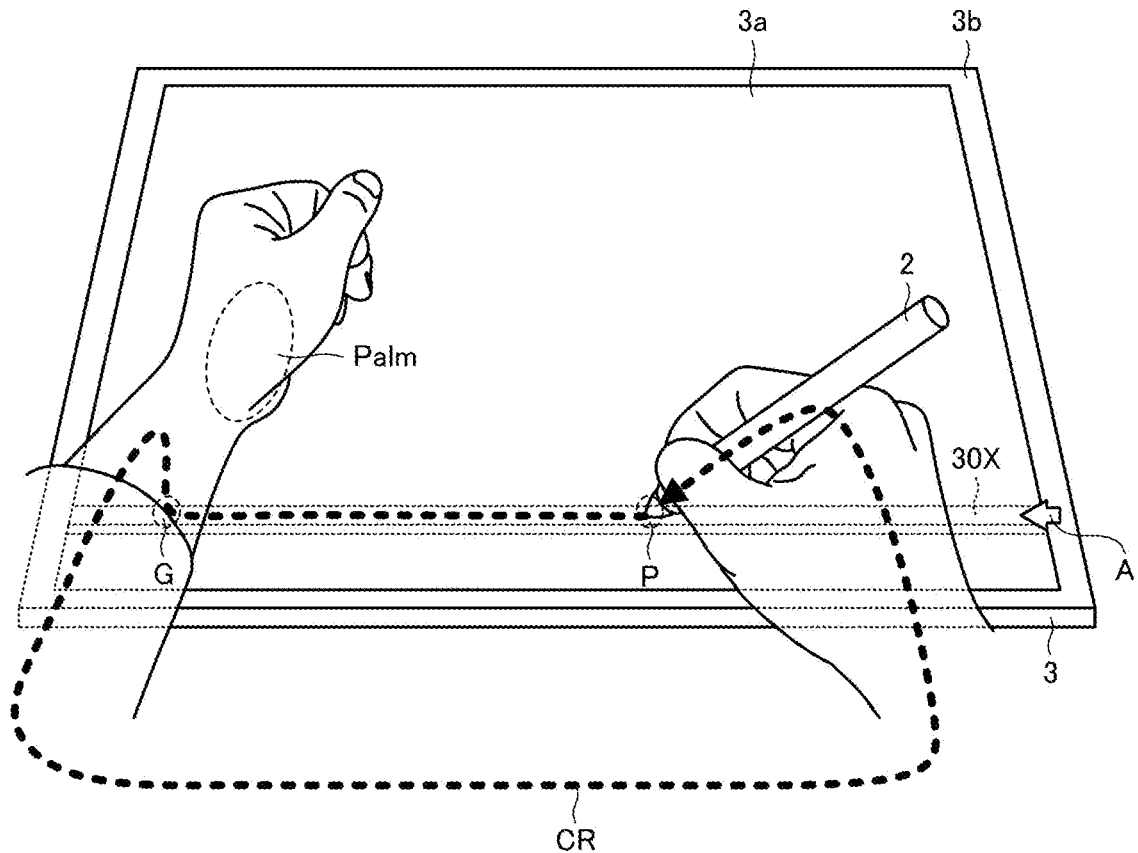
FIG. 22 is a view illustrating an example of a state of use of the position detection system according to a second embodiment of the present disclosure.
Figure 23:
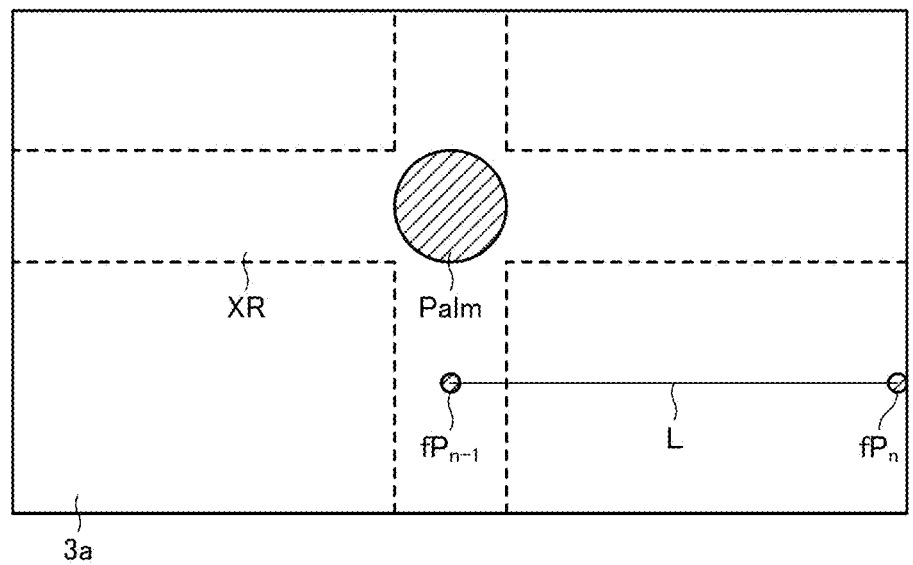
FIG. 23 is a diagram depicting an operation of a host processor according to a related art of the second embodiment of the present disclosure.

FIG. 22 is a view illustrating an example of a state of use of the position detection system 1 according to the present embodiment. FIG. 23 is a diagram explaining an operation of the host processor 32 according to the related art of the present embodiment. An object of the present embodiment is hereinafter initially described with reference to FIGS. 22 and 23, and subsequently an operation of the sensor controller 31 according to the present embodiment is touched upon.

As illustrated in FIG. 22, during input operation using the active pen 2, there occurs such a situation where the user brings the hand (hereinafter referred to as left hand) opposite to the hand (hereinafter referred to as right hand) holding the active pen 2 into contact with the touch surface 3a. In this case, the contact position of the left hand (palm region Palm in the figure) is excluded from both the touch position and the pen position by the process described in the first embodiment. Apart from this contact position, a pen position (ghost position G depicted in the figure) may be detected below the left arm. This pen position is produced when a current path CR (current path extending from pen electrode of active pen 2 toward sensor electrodes 30X, entering left arm, passing through human body, and returning to active pen 2) is formed as depicted in the figure. In this case, a transmission signal of the active pen 2 may be detected below the left arm. While the example of the sensor electrodes 30X is depicted in FIG. 22, this situation is also applicable to the sensor electrodes 30Y.

The level of the signal detected at the ghost position G is lower than the level of the signal detected at the contact position of the active pen 2 (pen position P depicted in the figure). Moreover, the active pen 2 detectable by the tablet 3 at a time is normally only one pen. Accordingly, the ghost position G produces no problem as long as the active pen 2 contacts the touch surface 3a. However, when the active pen 2 suddenly shifts from a bezel region 3b of the tablet 3 to the inside of the touch surface 3a along an arrow A depicted in the figure, for example, the sensor controller 31 may detect the ghost position G before detection of the actual pen position P.

FIG. 23 depicts the ghost position G initially detected in this situation as the (n−1)th decided pen position $fP_{n-1}$, and the pen position P subsequently detected as the nth decided pen position $fP_n$. When the decided pen positions $fP_{n-1}$ and $fP_n$ are successively detected, the host processor 32 having received these pen positions draws a line segment L between these pen positions as depicted in FIG. 23. However, this drawing of the line segment L is not intended by the user, wherefore formation of the line segment L needs to be prevented. The object of the present embodiment therefore is to prevent formation of the line segment L. An operation of the sensor controller 31 for achieving this object is hereinafter described in detail with reference to FIG. 24.

Figure 24:
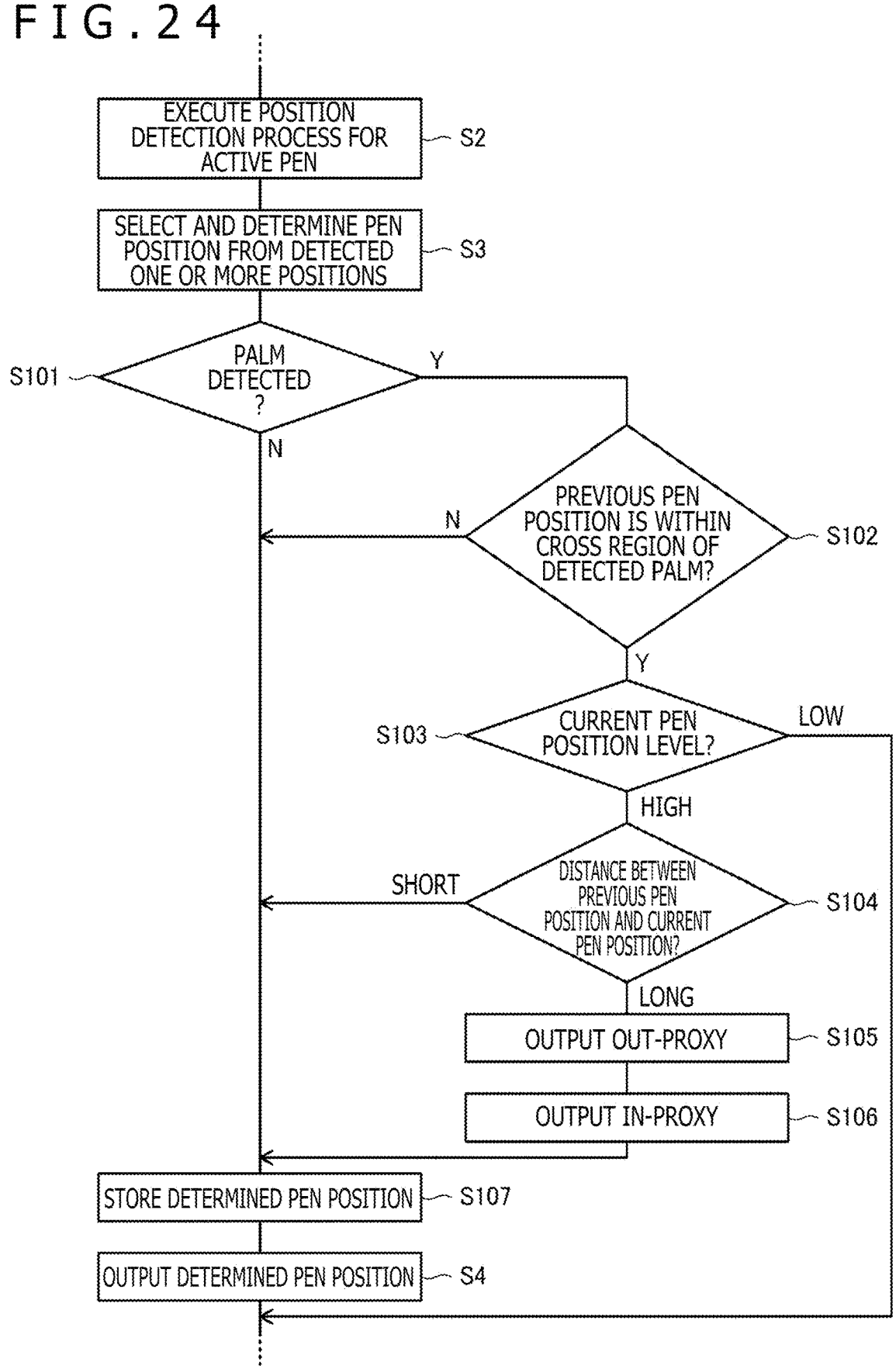
FIG. 24 is a flowchart depicting an outline of a pointer position detection process executed by the sensor controller according to the second embodiment of the present disclosure.

FIG. 24 is a flowchart depicting a pointer position detection process executed by the sensor controller 31 according to the present embodiment. This figure depicts S101 to S107 added to the pen detection steps depicted in FIG. 3. The operation of the sensor controller 31 according to the present embodiment is hereinafter described in detail with reference to FIG. 24 and again FIG. 23.

The sensor controller 31 (more specifically, MCU 40 depicted in FIG. 4) according to the present embodiment determines the pen position at S3, and then determines whether or not the touch position, for which the region type is determined to be palm, has been detected in the touch detection process (see FIG. 3) performed immediately before (S101). When it is determined that the touch position has not been detected, the sensor controller 31 stores the determined pen position separately from the pen position table described above (S107), and performs the output process at S4. When it is determined that the touch position has been detected, the sensor controller 31 subsequently determines whether or not the pen position stored previously at S106 (previous pen position) lies within a predetermined region formed based on the detected palm region Palm (S102).

FIG. 23 depicts an example of the predetermined region. The sensor controller 31 is configured to acquire an extent of the palm region Palm from the correlation values described with reference to FIG. 5, and further acquire a cross region (cross region XR) within the touch surface 3a as a region corresponding to the sensor electrodes 30X and 30Y and passing through the inside of the palm region Palm based on the extent thus acquired. The predetermined region is constituted by the cross region XR acquired in this manner.

Returning to FIG. 24, the sensor controller 31 subsequently compares a level of a transmission signal (more specifically, position signal described above) transmitted from the active pen 2 and corresponding to the pen position (current pen position) determined currently at S3 with a predetermined threshold, and determines whether to output the detected pen position based on a result of the comparison (S103). More specifically, when it is determined that the level of the transmission signal is lower than the predetermined threshold (low), the process proceeds to processing after S4, and shifts to the touch detection process depicted in FIG. 3. When it is determined that the level of the transmission signal is the predetermined threshold or higher (high), the process proceeds to S104. The threshold used at S103 herein is set to a value lower than the predetermined value used for detecting the position of the active pen 2 by the MCU 40. The processing at S103 corresponds to processing for increasing the threshold for detecting the pen position as a post process. In this manner, reduction of the possibility of detection of the ghost position G is achievable within the cross region XR.

Thereafter, the sensor controller 31 calculates a distance between the previous pen position and the current pen position. This distance corresponds to the distance between the decided pen positions $fP_{n-1}$ and $fP_n$ in FIG. 23. The sensor controller 31 subsequently determines whether the distance exceeds a predetermined value (long) or not (short) (S104). When it is determined that the distance exceeds the predetermined value, the sensor controller 31 sequentially outputs, to the host processor 32, pen-up information OUT-PROXY indicating that the active pen 2 is separated from the touch surface 3a, and pen-down information IN-PROXY indicating that the active pen 2 is in contact with the touch surface 3a (steps S105 and S106). When it is determined that the distance does not exceed the predetermined value at S104 and after completion of S106, the sensor controller 31 stores the determined pen position separately from the pen position table described above (S107), and performs the output process at S4.

As described above, the pointer position detection process of the present embodiment can output the pen-up information OUT-PROXY to the host processor 32 when the distance between the pen position currently detected and the pen position previously detected exceeds the predetermined value. In this case, the host processor 32 determines the current pen position and the previous pen position belong to different strokes. Accordingly, formation of an unnecessary line segment caused by presence of the ghost position G, such as the line segment L depicted in FIG. 23, can be prevented.

It should be understood that the present disclosure is not limited to the specific preferred embodiments described herein. Needless to say, the disclosure may be practiced in various modes without departing from the subject matters of the present disclosure.

For example, the pointer position detection process according to the present embodiments may be practiced in preferred modes other than the modes described herein. Specific examples of other modes are hereinafter described.

Figure 21A:
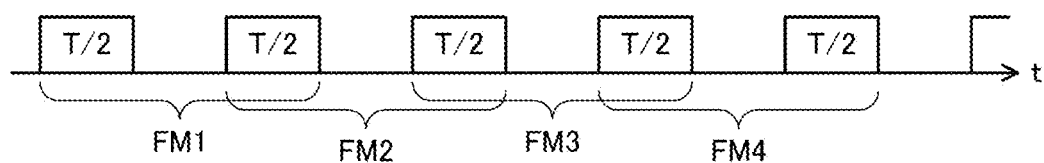
FIG. 21A is a chart depicting a control sequence of a pointer position detection process according to a first modified example of an embodiment of the present disclosure.

FIG. 21A is a chart depicting a control sequence of a position detection process according to a first modified example of the present embodiments. The MCU 40 of the present modified example is configured to perform a ½ process at predetermined intervals, and combine partial detection data obtained in the ½ process and partial detection data obtained in the process performed immediately before the ½ process to generate entire detection data FM1, FM2, FM3, FM4 and others at a twice higher rate. In each of the intervals, either the position detection process for the active pen 2 or the pixel driving operation may be executed, or both the position detection process for the active pen 2 and the pixel driving operation may be executed in a time-divided manner.

In association with the first modified example, the MCU 40 may determine whether to execute the position detection process for the finger 4 at the predetermined intervals, and execute the position detection process for the finger 4 as a process divided into N parts only when the position detection process for the finger 4 is determined to be executed. When it is determined that the process is not executed, S5 to S7 depicted in FIG. 3 are replaced with S103 depicted in FIG. 2. In this manner, the method for executing the position detection process for the finger 4 can be switched in accordance with the necessity of execution of the position detection process for the active pen 2 or the pixel driving operation.

Figure 21B:
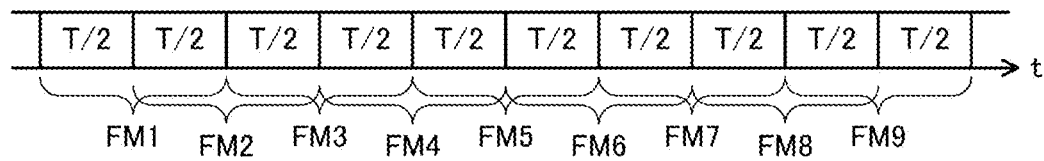
FIG. 21B is a chart depicting a control sequence of a pointer position detection process according to a second modified example of an embodiment of the present disclosure.

FIG. 21B is a chart depicting a control sequence of the position detection process according to a second modified example of the present embodiments. The MCU 40 of the present modified example is configured to perform the position detection process for the finger 4 successively executed (without providing intervals) but divided into two parts. In this manner, as depicted in this figure, the entire detection data FM1, FM2, FM3, FM4 and others can be generated at a twice higher detection rate than the rate of the position detection process for the finger 4 completed by one process.

Figure 21C:
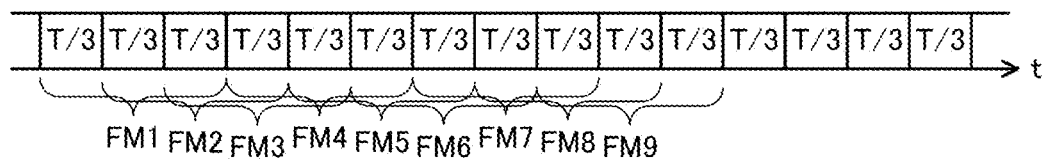
FIG. 21C is a chart depicting a control sequence of a pointer position detection process according to a third modified example of an embodiment of the present disclosure.

FIG. 21C is a chart depicting a control sequence of the position detection process according to a third modified example of the present embodiments. The MCU 40 of the present modified example is configured to perform the position detection process for the finger 4 successively executed (without providing intervals) but divided into three parts. In this manner, as depicted in this figure, the entire detection data FM1, FM2, FM3, FM4 and others can be generated at a three times higher detection rate than the rate of the position detection process for the finger 4 completed by one process.

Moreover, while the example which divides the position detection process for the finger 4 (passive pointer) into a plurality of processes has been described in the embodiments, the position detection process for the active pen 2 may be similarly divided into a plurality of processes.

According to the embodiments described above, the MCU 40 always uses the pen position table and the touch position table for performing the output position determination process. However, when only one position is detected at S21 in FIG. 9, for example, this position may be determined as a pen position to be output, and the pen position determination process at S3 may be skipped. Similarly, when only one position is detected at S51 in FIG. 9, for example, this position may be determined as a passive pointer position to be output, and the passive pointer position determination process at S8 may be skipped.

According to the embodiments described above, the logic circuit 41 and the MCU 40 repeatedly perform, for the respective sensor electrodes 30Y, the operation for selecting the one sensor electrode 30Y, and causing the transmission circuit 42 to sequentially input the pulse groups $p_1$ to $p_k$ described above to the respective sensor electrodes 30X. However, the reception circuit 44 may be provided for each of the sensor electrodes 30Y to execute the processes for the respective sensor electrodes 30Y in parallel. In this case, it is difficult to produce the advantage of reduction of the time required for the position detection process in the second and fourth examples using the contents of the 1/N process depicted in FIGS. 15A and 15B and FIGS. 17A and 17B. However, the one reception circuit 44 can be shared by the two sensor electrodes 30Y, wherefore a new advantage of reduction of a circuit scale of the reception circuits 44 is achievable in comparison with the configuration providing the reception circuit 44 for each of the sensor electrodes 30Y.

What is claimed is:

1. A sensor controller connected to a sensor pattern, the sensor controller comprising:
   a processor; and
   a memory storing at least one program that, when executed, causes the sensor controller to:
   i) detect a pen signal transmitted via a pen electrode provided at a distal end of an active pen;

ii) detect a position of the active pen based on a level of the pen signal detected;

iii) determine a distance between a current position of the active pen detected by currently performing i) and ii), and a previous position of the active pen detected by previously performing i) and ii);

iv) when the distance exceeds a threshold value, output pen-up information indicative of the active pen separated from a touch surface and thereafter output the current position of the active pen; and v) when the distance does not exceed the threshold value, without outputting the pen-up information, output the current position of the active pen.

2. The sensor controller according to claim 1, wherein the at least one program, when executed, causes the sensor controller to:

when the level of the pen signal detected in i) equals or exceeds a first threshold, performing ii) detect the position of the active pen based on the level of the pen signal detected and, if the level of the pen signal detected is below a second threshold greater than the first threshold, not output the current position of the active pen.

3. The sensor controller according to claim 1, wherein the at least one program, when executed, causes the sensor controller to:

vi) detect a position of a passive pointer by detecting a change in capacitance in the sensor pattern; and vii) determine whether a type of the position of the passive pointer is a palm type or a finger type; and when the type of the position of the passive pointer is determined to be the palm type, performing iii) detect the distance between the current position of the active pen and the previous position of the active pen.

4. The sensor controller according to claim 3, wherein the at least one program, when executed, causes the sensor controller to:

when the level of the pen signal detected in i) equals or exceeds a first threshold, performing ii) detect the position of the active pen based on the level of the pen signal detected and, if the level of the pen signal detected is below a second threshold greater than the first threshold, not output the current position of the active pen.

5. The sensor controller according to claim 1, wherein the at least one program, when executed, causes the sensor controller to:

iv) when the distance exceeds the threshold value, output the pen-up information, thereafter outputting pen-down information indicative of the active pen in contact with the touch surface, and thereafter outputting the current position of the active pen.

6. The sensor controller according to claim 5, wherein the at least one program, when executed, causes the sensor controller to:

when the level of the pen signal detected in i) equals or exceeds a first threshold, performing ii) detect the position of the active pen based on the level of the pen signal detected and, if the level of the pen signal detected is below a second threshold greater than the first threshold, not output the current position of the active pen.

7. The sensor controller according to claim 1, wherein the at least one program, when executed, causes the sensor controller to:

iv) when the distance exceeds the threshold value, output the pen-up information, thereafter output pen-down information indicative of the active pen in contact with the touch surface, and thereafter output the current position of the active pen.

8. The sensor controller according to claim 7, wherein the at least one program, when executed, causes the sensor controller to:

vi) detect a position of a passive pointer by detecting a change in capacitance in the sensor pattern; and vii) determine whether a type of the position of the passive pointer is a palm type or a finger type; and when the type of the position of the passive pointer is determined to be the palm type, performing iii) determine the distance between the current position of the active pen and the previous position of the active pen.

9. The sensor controller according to claim 8, wherein the at least one program, when executed, causes the sensor controller to:

when the level of the pen signal detected in i) equals or exceeds a first threshold, performing ii) detect the position of the active pen based on the level of the pen signal detected and, if the level of the pen signal detected is below a second threshold greater than the first threshold, not output the current position of the active pen.

\* \* \* \* \*